United States Patent
Hughes

(10) Patent No.: US 10,630,489 B2
(45) Date of Patent: Apr. 21, 2020

(54) APPARATUS AND METHOD FOR MANAGING DIGITAL CERTIFICATES

(71) Applicant: SIXSCAPE COMMUNICATIONS PTE LTD, Oxley Bizhub (SG)

(72) Inventor: Lawrence Hughes, Oxley Bizhub (SG)

(73) Assignee: SIXSCAPE COMMUNICATIONS PTE LTD., Singapore (SG)

( * ) Notice: Subject to any disclaimer, the term of this patent is extended or adjusted under 35 U.S.C. 154(b) by 403 days.

(21) Appl. No.: 15/767,112

(22) PCT Filed: Jan. 15, 2016

(86) PCT No.: PCT/SG2016/050015
§ 371 (c)(1),
(2) Date: Apr. 9, 2018

(87) PCT Pub. No.: WO2016/153423
PCT Pub. Date: Sep. 29, 2016

(65) Prior Publication Data
US 2019/0074982 A1    Mar. 7, 2019

(30) Foreign Application Priority Data

Mar. 25, 2015 (SG) .......................... 10201502376W
May 21, 2015 (SG) .......................... 10201503999R

(51) Int. Cl.
G06F 21/60     (2013.01)
H04L 9/32      (2006.01)
(Continued)

(52) U.S. Cl.
CPC .......... H04L 9/3268 (2013.01); H04L 9/0863 (2013.01); H04L 9/3242 (2013.01);
(Continued)

(58) Field of Classification Search
CPC . H04L 9/3268; H04L 9/0863; H04L 63/0823; H04L 61/1511
See application file for complete search history.

(56) References Cited

U.S. PATENT DOCUMENTS

2006/0143442 A1* 6/2006 Smith ................. H04L 63/0823
                                                       713/156
2013/0145447 A1* 6/2013 Maron .................... G06F 21/31
                                                       726/6

OTHER PUBLICATIONS

Hughes, Lawrence E., "IRP—the Identity Registration Protocol", ICANN 52 Singapore, Feb. 9, 2015, XP055261182, Retrieved from the Internet: URL:https://singapore52.icann.org/en/schedule/mon-tech/presentation-irp-9feb15-en.pdf [retrieved on Mar. 29, 2016] the whole document.

(Continued)

*Primary Examiner* — Wasika Nipa
(74) *Attorney, Agent, or Firm* — Dentons US LLP

(57) ABSTRACT

An apparatus and a method for managing user identity, the method comprising: establishing a connection secured with Transport Layer Security (TLS) from a client device to an IRP server; authenticating, at the IRP server, user login via the client device, with Strong Client Authentication (SCA) or Username/Password Authentication (UPA); upon request from the client device, registering or retrieving at the IRP server user identity information comprising user information, and an Internet Protocol (IP) address of the client device; upon request from the client device, registering or retrieving at the IRP server one or more digital certificate; sending from the client device to the IRP server a Certificate Signing Request (CSR) via the secured connection; upon request from the client device, returning a signed digital certificate from the IRP server to the client device; sending a PKCS #12 package from the client device to the IRP (Continued)

server; and upon request from the client device, returning a PKCS #12 package from the IRP server to the client device.

13 Claims, 19 Drawing Sheets

(51) Int. Cl.
*H04L 29/06* (2006.01)
*H04L 9/08* (2006.01)
*H04L 29/12* (2006.01)

(52) U.S. Cl.
CPC ........ *H04L 9/3249* (2013.01); *H04L 63/0823* (2013.01); *H04L 63/166* (2013.01); *H04L 61/1511* (2013.01)

(56) References Cited

OTHER PUBLICATIONS

International Search Report issued in International Application No. PCT/SG2016/050015 dated Apr. 7, 2016.
International Preliminary Report on Patentability and Written Opinion of the International Searching Authority issued in International Patent Application No. PCT/SG2016/050015 dated Apr. 7, 2016.

* cited by examiner

Standard TLS 1.2 handshake (100)

UPA – TLS 1.2 with Server Authentication & Password Authentication

SCA – TLS 1.2 with Mutual Authentication

Web – Request New Certificate

Web – Approve CSR

Web – Sign CSR

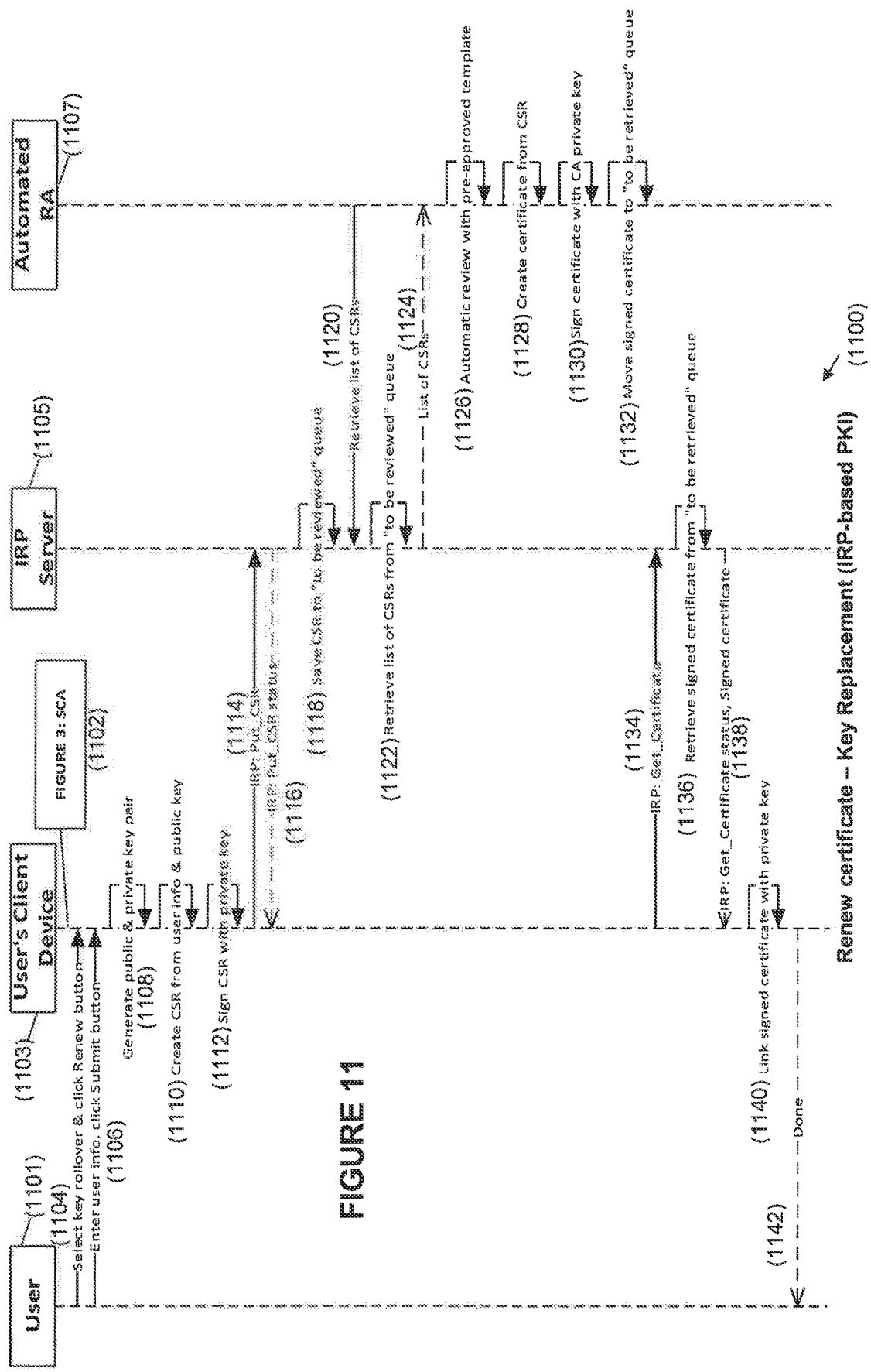

Revoke certificate (IRP-based PKI)

Backup key (IRP-based PKI)

Recover key (IRP-based PKI)

of drawings list the figures.

APPARATUS AND METHOD FOR MANAGING DIGITAL CERTIFICATES

CROSS-REFERENCE TO RELATED APPLICATIONS

This application is a National Stage of PCT/SG2016/050015, filed Jan. 15, 2016, which claims priority under 35 U.S.C. § 119 to SG Application No. 10201502376W, filed Mar. 25, 2015 and SG Application No. 10201503999R, filed May 21, 2015, all of which are incorporated herein by reference in their entirety.

FIELD

The present invention relates to an apparatus and method for managing digital certificates.

BACKGROUND

Conventional Public Key Infrastructure (PKI) systems are centralized (one big server). This leads to issues with scalability and management (the Registration Authority (RA) is "too far removed" from the applicants for client certificates). No one would try to create a single giant Domain Name System (DNS) Server that could provide mapping of domain style nodenames (FQDNs) to IP addresses for the entire Internet. No one node could handle the bandwidth or processing requirements. The "one big server" approach can handle the volumes for server certificates (a few million), but each secure server might have thousands or even millions of users, each of which requires a unique client certificate. The volume of client certificates could be several orders of magnitude greater than that of server certificates—too large to handle from a single big server. Validating information for server certificates is also simpler than validating information for client certificates, and is best done "near" to the applicants (e.g. by an organization for its employees or customers).

Conventional PKIs systems are also mostly based on web protocols. This introduces security and reliability issues (due to dependence on web browsers and servers and the nature of Hypertext Transfer Protocol (HTTP)), as well as usability (too many complicated manual procedures that require knowledge of PKI and cryptography). Due to the large number of deployed legacy web based products, it is difficult to require (or even implement) recent security standards (like Transport Layer Security (TLS) v1.2), leading to vulnerabilities for which solutions already exist.

DNS worked fairly well for the IPv4 Internet, providing name resolution for mostly static servers. Even with Domain Name System Security Extensions (DNSSEC) (digital signing of all resource records), it is having more and more serious security issues. Again, the large installed base of DNS makes such improvements very difficult (after 15 years, DNSSEC is still not widely deployed, and most client software cannot make use of its new information). It is not very responsive (new information may take 24-48 hours to become available globally). This is a problem for highly mobile IPv6 nodes (like phones or tablets), that might change IP address multiple times in a single day. It also has no integrated user directory, hence no per-user authentication. Dynamic registration is difficult and completely unsecured.

SUMMARY

According to an example of the present disclosure, there are provided a method, an apparatus and a non-transitory computer readable medium as claimed in the independent claims. Some optional features are defined in the dependent claims.

BRIEF DESCRIPTION OF THE DRAWINGS

Various embodiments of the present disclosure will now be described, by way of example only, and with reference to the accompanying drawings in which:

FIG. 11 is a flow diagram illustrating infrastructure for key replacement procedure during renewal of a digital certificate according to an example of the present disclosure.

DETAILED DESCRIPTION

Figure 1:
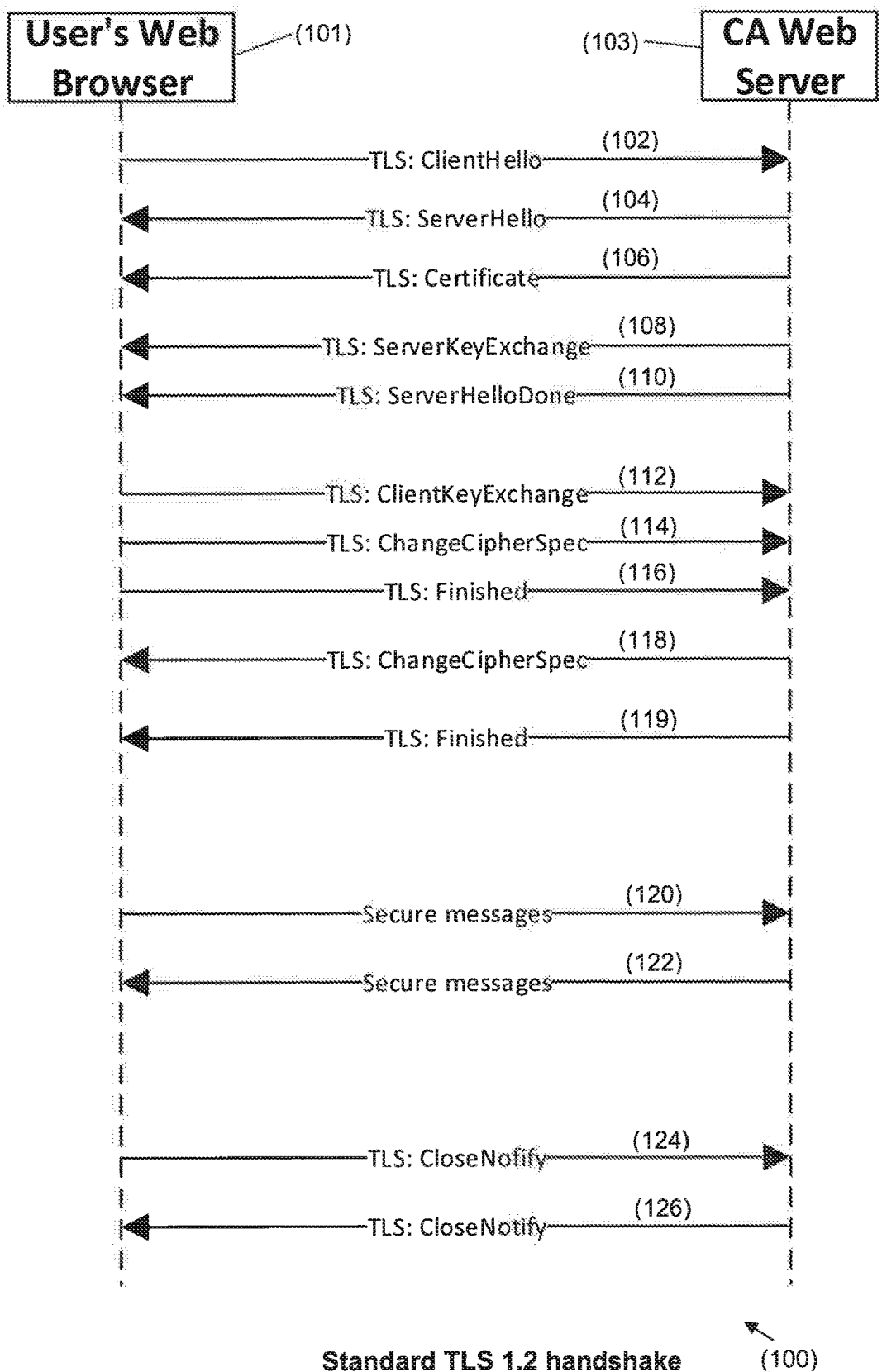
FIG. 1 is a flow diagram illustrating standard Transport Layer Security (TLS) 1.2 handshake.

The present disclosure includes an example of an apparatus and a method utilizing an Identity Registration Protocol (IRP), which is a secure network protocol intended to provide at least three main functionalities, integrated into a unified system that may comprise one or more servers and/or user devices (e.g. mobile devices, computers, and the like). An example of the present invention provides the apparatus and the method utilizing the newly created Identity Registration Protocol (IRP).

The three main functionalities refer to:
- A User Directory (similar to Lightweight Directory Access Protocol (LDAP), but much easier to configure and use)
- A Distributed PKI (similar to existing Certification Authorities (CAs), but with every function available via protocol)
- An Address Registry (similar to DNS, but far better security and responsiveness)

The specific functions provided by the apparatus and the method are:
- Allow any user or device to securely register their identity (name, email address, contact info, etc), plus the Internet Protocol (IP) addresses of the device they are currently using, and their X.509 client digital certificate
- Allow any device to request and download various kinds of X.509 digital certificates
- Provide validity and revocation status of any issued digital certificate to any user
- Allow any user to revoke or renew their own digital certificate (obtained via IRP)
- Obtain other users' registered information, including current IP addresses and digital certificate There are several kinds of digital certificates that can be issued and managed via the IRP:
- Server Certificate (binds the public key to a node's Fully Qualified Domain Name (FQDN))—to enable TLS on a secure server (web, email, LDAP, etc)
- Client Certificate (binds the public key to a user's name and email address)—to provide strong client authentication to Secured Sockets Layer (SSL)/TLS secured servers (web, email, LDAP, IRP, etc), as well as for end2end secure applications (S/MIME email, peer to peer secured messaging, etc)
- Internet Protocol Security (IPSec)/Internet Key Exchange (IKE) Certificate (binds the public key to nodename and IP addresses of a node)—for mutual authentication of endpoints using IPsec (e.g. for Virtual Private Network (VPN)). The IPsec certificates are actually used by IKE (Internet Key Exchange v2, RFC 5996) for mutual authentication—symmetric session key exchange is actually accomplished with Diffe-Hellman Key Exchange). IPsec uses the symmetric session key exchanged by IKE.
- Resource Public Key Infrastructure (RPKI) Certificate—for nodes using Secure Neighbor Discovery (RFC 3971). SEND protects Address Resolution (mapping IP addresses to Link Layer addresses), Router Discovery, Neighbor Discovery, Neighbor Unreachability Detection, Duplicate Address Detection and Stateless Address Autoconfiguration (SLAAC). X.509 extensions are required for IP address and Trust Anchor.

The IRP is an aspect of the present example of the invention herein described.

IRP can be implemented as a distributed system similar to Domain Name System (DNS) in some respects. Unlike DNS, it allows registration of information about a person (in some cases about the device from which they have most recently used IRP), not a network node. As with Domain Name System Security Extensions (DNSSEC), all registered information is digitally signed by the Domain Identity Registry (DIR) server, and those digital signatures are provided to clients along with the resource records, to establish creator authentication (the information was definitely created by the authoritative server) and message integrity (the information has not been tampered with along the way).

Unlike Conventional Public Key Infrastructures (PKIs), IRP does not depend on web technology, and is not layered on top of HTTP (as for example Online Certificate Status Protocol (OCSP) is).

IRP is created in a way that may deploy a Global Identity Registry, to provide user identity as a service, including PKI and Internet Protocol (IP) address as part of the user's identity. Like DNS, it is distributed, and consists of many DIR servers, typically one per Internet domain (or subdomain).

A DIR server may include several components, some of which are optional:
- A database (PKI_DB) to hold the user identity information, including IP address and PKI objects. For subcarrier grade deployments, this is currently implemented with Postgresql, either running on Windows, or on a multiple Linux server configuration with failover and database replication. For carrier grade deployments, Microsoft SQL Server Enterprise is used to integrate with multiple IRP server front-ends for highest scalability and reliability.
- An IRP Server. An example of this is deployed as a Windows Service. This service accepts connections on port 4604 (IRP) over IPv4 or IPv6 using explicit TLS 1.2, and implements the server side of IRP. Authentication normally uses strong client authentication (SCA) with X.509 client certificates, but can allow fallback to Username/Password Authentication (UPA) on a per-user basis. It uses PKI_DB for all data storage. Multiple IRP servers can be deployed using a single High Availability (HA) database backend and a load balancer to distribute incoming connections to the various servers.
- An Admin Tool (PKI_Tool) for handling manual tasks, such as creating the root and intermediate keys for a certificate hierarchy, manual signing of Certificate Signing Requests (CSRs) and certificates, administrative revocation of certificates, etc. This is a Windows GUI app, written in C#.Net. It uses PKI_DB for all data storage.
- An Online Certificate Status Protocol (OCSP) server, for legacy clients (like web browsers or servers) to obtain certificate revocation information. This is another Windows Service that obtains the current revocation information from PKI_DB. Each issued certificate (that supports OCSP) contains the Uniform Resource Locator (URL) where the relevant OCSP information can be found for that certificate.
- A Certificate Revocation List (CRL) generator for even older legacy clients. This periodically creates and publishes (via HTTP or LDAP) revocation status on issued certificates from the current information in PKI_DB. The CRLs are a digitally signed list of the serial numbers of revoked certificates. These comply with the CRL v2 specification, and can be partitioned as needed. HTTPS and LDAPS servers are needed to publish the CRLs. Each issued certificate (that supports CRL) contains the URL where the relevant CRL can be found.

Microsoft Active Directory (AD) integration service. This allows integration of the DIR user information with Active Directory, including creation of DIR accounts for any (or all) AD accounts, access to DIR information via AD calls, and publishing of DIR certificates in AD. This is another Windows service.

IRP is a text based request/response protocol. Each message is a compliant EXtensible Markup Language (XML) document, layered over Transport Control Protocol (TCP). Messages can be secured with XML Digital Signatures and any sensitive fields can be encrypted using XML Encryption. Most PKI objects are kept in PEM format. Binary objects (e.g. PKCS12 packages) are encoded in Base64 in the messages.

Privacy and Server to Client authentication is provided with TLS v1.2 with a rich set of Cryptosuites (AES, Camellia, SHA2, RSA, ECC, etc). TLS is implemented in "explicit" mode, which means the connection starts in non-secure mode, does capability negotiation, and then switches to secure mode by the client sending a "START-TLS" message. All of this is done on a single port 4604.

Client to Server authentication is normally provided by Strong Client Authentication (SCA) with X.509 client certificates), with optional fallback (on a per-user basis) to Username/Password Authentication (UPA). Passwords are sent unencrypted, so UPA should only be used after switching to a secure mode. The IRP server uses PBKDF2 (RFC 2898) to strongly hash passwords with salt before storing in the PKI_DB. This minimizes risk of exposure of UPA credentials in the event of a server compromise. When a client authenticates with SCA, the UserID from the Subject Distinguished Name of the supplied client certificate is verified as a valid account in PKI_DB, and used to identify the logged-in user.

IRP is similar in certain respects to Cisco's SCEP (Simple Certificate Enrollment Protocol, draft-gurmann-scep-00), but is integrated with a User Directory, has better security, is not layered on HTTP, and handles more type of digital certificates (not just IPsec). SCEP is used primarily for routers to obtain IPsec digital certificates, which are used for mutual strong authentication in node to node connections using IPsec (specified in RFC 4301, "Security Architecture for the Internet Protocol").

Innovation in IRP

The IRP of the present example described herein is the first certificate management protocol created that incorporates a user directory or an IP address registry. The user directory supports strong authentication of the user, which is absolutely critical. The following technical paper ("The Use of the Simple Certificate Enrollment Protocol (SCEP) and Untrusted Devices" by Certified Security Solutions, Inco (CSS); Published in year 2012; Authors: Ted Shorter and Wayne Harris) explains why this lack is a fundamental flaw in SCEP, making it untrusted:

https://www.css-security.com/media/1350/scep-and-untrusted-devices.pdf One use of the user directory is to provide authentication of a user accessing the system. Previous certificate management systems did not provide any authentication, or if there was any authentication required it was a simple username/password (referred to in this document as UPA Username/Password Authentication). UPA is very weak today. Hackers can capture the username/password database from a server running the UPA and obtain all users' credentials in short order (this was how a massive breach can be done). It is also possible to install a "keyboard sniffer" on any user's computer and see the credentials typed in by the user. Hackers can also trick a user into connecting to a bogus site (via a DNS hack) and entering credentials into what looks like, for instance, a banking site.

The address registry was included to support End2End Direct messaging over IPv6. This involves a whole new way for network applications to interact, made possible by the design of IPv6. IRP does not use this new method, it provides infrastructure necessary for it to be done. IRP itself is classic client/server architectures, and works equally well over IPv4 or IPv6, End2End Direct applications work within a single "flat" private internet over IPv4, or between any two nodes anywhere in the world over IPv6. Because of Network Address Translation and Private Internets, it does not work between any two arbitrary nodes in the global IPv4 Internet. There cannot be even a single NAT gateway between the two parties.

The mechanisms described here are not related to the address registry other than making it more secure.

There are four mechanisms described. They are used in IRP, but all could be used in other protocols. They are all related to security. Since IRP is used to provide and manage digital identity, it must be unusually well secured itself. If a hacker can break IRP, they can cause all kinds of problems. This document specifies some of the advanced mechanisms used to make IRP this secure.

Some key aspects of the IRP are as follows.
 1. Strong Client Authentication (SCA), Username/Password Authentication (UPA) and "Per-User UPA Fallback"
 2. Online Certificate Revocation Checking
 3. Online Certificate Validity Checking
 4. Digital Signing of Every Message in the IRP Protocol SCA, UPA and "Per-User UPA Fallback"

IRP normally uses Strong Client Authentication (SCA) at login, for the user to authenticate to the server. With SCA, instead of a username and password, the user supplies their X.509 client digital certificate (possibly provided directly by a system administrator, or obtained online via IRP) to identify themselves. The actual proof of identity is based on possession of the private key associated with the public key in the certificate (verified by the server doing a "cryptographic challenge"). SCA is described in RFC 5246, "The Transport Layer Security (TLS) Protocol Version 1.2" (section 7.4.6 and 7.4.7). TLS is the current name for SSL (Secure Socket Layer), since it was contributed to the Internet Engineering Task Force by Netscape.

Strong Client Authentication has been around since SSL v3.0 (1996), but has never been widely used. One reason is the lack of a simple, secure way for users to obtain client digital certificates. Another is the bad implementation of this mechanism in most client and server software (e.g. web browsers and web servers).

All current TLS compliant servers that support strong client authentication have three possible settings related to whether UPA, SCA or both can be used:
 UPA only (no client certificates accepted—all users must supply a username and password)

SCA allowed (user will be prompted to supply a client certificate, but if no acceptable one is provided, the server will fall back to UPA and ask for username and password)

SCA required (user will be asked for a client certificate, and if they cannot provide an acceptable one, access is denied)

The security problem is that this setting applies to all users of the system at any given time. There is no way to disable UPA on a per-user basis. It is disabled for all or for none. This means that for the strongest setting ("SCA Allowed") to be selected, all users must have client digital certificates (and the corresponding private keys). If even a single user needs to have UPA Fallback enabled (e.g. to request a new digital certificate), UPA must be enabled for ALL users, and the passwords for all users must be accessible (unencrypted) on the server at all times, hence, are subject to harvesting by hackers.

Because implementation of IRP has an integrated user directory, it allows "per-user" enabling of UPA Fallback, optionally for a short period of time (e.g. "one has 30 minutes to obtain a new certificate"). All other users can only authenticate using SCA (no UPA Fallback). Furthermore, when a user's UPA Fallback is disabled, his stored password (which may already be protected in hashed, salted form) is strongly encrypted. If a hacker manages to capture the user database, they will only be able to recover the credentials of users whose UPA is currently enabled (only a tiny fraction of the users, if any). This essentially eliminates the possibility of a massive credential compromise.

Only the system administrator can enable or disable UPA Fallback for a user. When UPA Fallback is disabled, the "UPA Allowed" field in the user's database entry is set to false, and their salted, hashed password is encrypted using a key known only to the server (ideally kept in an Hardware Security Module (HSM)). When UPA Fallback is enabled for a given user, the "UPA allowed" field in their database is set to true, and their hashed, salted password is decrypted. UPA Fallback can optionally be enabled for a set time (e.g. 30 minutes) after which UPA will automatically be disabled for them again, whether or not they have obtained a new client certificate. In the present case, since IRP itself is how the user obtains their client certificates, when the user obtains their new certificate. UPA Fallback is a feature that may be automatically disabled.

When a new server is deployed, if the "user centric" PKI model is used (all public/private key material is created on the client, a CSR is submitted, and the certificate is signed on the server and downloaded), then UPA Fallback would be enabled for all users. As they obtain their client certificates, UPA Fallback would be disabled for them. If a time limit is set, any users that still have UPA Fallback enabled would be set to disabled, and the administrator would need to enable UPA Fallback for each one, long enough for them to obtain a client certificate. Optionally, the system administrator can create key material (public certificate and private key) and distribute them securely to users (in PKCS #12 packages or USB security token). In that case, all users would have UPA Fallback disabled from the beginning.

With SCA, there is nothing stored on the server that would allow a hacker to assume their identity. To authenticate with SCA, a user must have access to their private key (to respond to a cryptographic challenge, which involves decrypting something encrypted with their public key).

One of the things advantageous in the present disclosure is the "per-user UPA Fallback" (typically for a short time period).

This mechanism is applicable to any server secured with SSL/TLS, not just IRP. If the server uses the IRP database for authentication and access control, the automatic ending of UPA Fallback when the user obtains their client certificate could be implemented. The secure server would need to be modified to allow UPA Fallback only for users with "UPA Fallback allowed" set to true in the user database.

Over and above the concepts of TLS, SCA or UPA, what is new and innovative in IRP is the ability to enable UPA (allowing only SCA) per-user (for one or a few users at a time). Current systems only allow this to be enabled for everyone or no one. This provides a significant improvement in security and makes SCA more viable.

Online Certificate Revocation Checking

An application utilizing IRP can enable better online Certificate Revocation Checking.

There is already a protocol for checking certificate revocation status, defined in RFC 6960, "X.509 Internet Public Key Infrastructure Online Certificate Status Protocol-OCSP "(Originally RFC 2560, June 1999). This provided a better alternative to Certificate Revocation List (CRL) checking.

Before a user uses any certificate owned by the user, or that is presented to the user in a protocol, the user must determine its validity (whether it chains up to a trusted root certificate) and its revocation status (whether it has been revoked since it was issued). Once a certificate expires (passes its "Not After" date), a certificate should be rejected immediately. Assuming a certificate is within its validity period (between the included start and end dates), any certificate should have these two things checked.

Certificate revocation is similar to credit card revocation. Originally this was handled by printed booklets of revoked credit card numbers, today this is done using a small machine that connects to a database with lists of expired cards (and available balances).

The credit card "booklet" model corresponds to Certificate Revocation Lists (CRLs) in PKI. CRLs are defined in RFC 3280, "Internet X.509 Public Key Infrastructure Certificate and Certificate Revocation List (CRL) Profile". A CRL is essentially a list of serial numbers of certificates in a specific hierarchy, digitally signed by the Certification Authority (CA), updated periodically (e.g. once every 24 hours) and published via web or LDAP.

Each digital certificate issued by a Certification Authority (e.g. VeriSign) contains a "CRL Distribution Point" field that contains the full URL where anyone (or any application) can obtain the current CRL for that hierarchy (for example, URL=http://crl3.digicert.com/ DigiCertSHA2AssuredIDCA-g1.crl). Every hierarchy managed by a CA has a CRL published. When a user verifies a certificate, the user may download the CRL (found at the CRL distribution point for that certificate), verify the signature of the CRL, then check the list of serial numbers for the serial number of the certificate the user is verifying. If that serial number is not present, the certificate is fine or Okay (OK) (not revoked).

CRLs are difficult to work with, can grow large (hence take a long time to download) and are only updated periodically. If that period is 24 hours, it could take 48 hours before all users may be aware that a certificate has been revoked. Many uses of a newly revoked certificate could happen before the first CRL showing it revoked is available. Hackers could also block access to the CRL, causing a denial of service (or forcing users to decide whether or not to accept a certificate without revocation information).

OCSP was created as an improvement to CRLs. Basically an OCSP server ("responder") has access to the revocation status of the certificates (either directly in the backend database, or indirectly via getting CRLs). It is much simpler for applications to make a connection via OCSP to determine revocation status of a certificate than to work directly with CRLs. If the OCSP server has direct access to the back end database, then relying applications can obtain current status on certificate revocation in near-real time. If the OCSP server is just relaying information from generated CRLs, then there will still be significant time lag after revocation before all relying parties can find out about it.

OCSP is typically implemented over HTTP, which means it may be subject to reliability, usability and security issues related to web browsers and/or web servers. The HTTP protocol itself is poorly designed and not easy to work with (e.g. the very limited "get" and "post" mechanisms).

As with CRL, a certificate can contain an "OCSP Distribution Point" (URL where a user can contact the OCSP server via HTTP or LDAP).

The information obtained from using OCSP is not ideal—one gets back one of two results—"revoked" or "unknown" (which could be "certificate is not revoked" or "revocation information is not available"). It would not be difficult (with the existing design) for a hacker to convince a user to accept bogus information. If SSL/TLS is not used, the message contents could be altered on the fly.

There is provided a capability similar to OCSP as a part of IRP. It can be used to provide revocation information on any certificate issued by the DIR server contacted (by direct access to the database information). If the certificate was not issued by the DIR server that was contacted, assuming a user provides the complete certificate, it could recursively determine the revocation status of the certificate indirectly either by contacting the issuing DIR server, by an OCSP request to the issuing CA (in which case the response has the limitations listed above for OCSP) or even by CRL retrieval from the CA (with optional caching).

The IRP request is much simpler than using either CRL or OCSP mechanisms, so it is more likely to be used. If the application already is using IRP (e.g. to obtain a client digital certificate) then checking revocation status through it is very little additional effort.

It is critical that all certificates are checked by all relying applications for revocation, so anything that makes this easier is a big win overall (and increases the probability that revocation will be checked). IRP allows a user to offload the complexity of CRLs or even OCSP onto the IRP server.

If an IRP alternative front end is added to any existing PKI (in addition to any web based access it may have), then the IRP server can be given Application Programming Interface (API) access to the back end revocation status of all certificates, so that it can relay that information to any IRP-enabled client. All IRP-enabled applications are designed to check certificate revocation via IRP before any certificate usage.

Online Certificate Validity Checking

An application (or in short app or apps in plural form) utilizing IRP can enable online Certificate Validity Checking.

A problem arises when determining the validity of a certificate before any usage of that certificate. Certificates are usually created in hierarchies that chain up to a trusted root certificate. Certificate validity is checked by "climbing the trust chain" from the certificate in question up to some "trusted" root. Each step up the trust chain is done by finding the certificate that signed the current one (by finding a certificate whose Subject Distinguished Name is the same as the Issuer Distinguished Name in the certificate to be checked. Each certificate is digitally signed using the private key associated with its parent certificate, so its signature is validated using the public key from the parent certificate. This is done repeatedly until a user reaches a certificate that is self-signed. A self-signed certificate is digitally signed by the private key associated with the public key in the certificate (it is its own parent—in a root certificate, the Subject Distinguished Name and Issuer Distinguished Name are the same).

In order to do digital certificate validity checking, the user needs the public keys of all parent certificates (no need for the private keys). With a "public hierarchy" certificate, these parent certificates are typically preloaded in applications (e.g. web browser) by the application vendor, after checking to make sure the Certification Authority (CA) operates in a trusted manner, etc). The root certificates can be found in the Internet Explorer certificate manager under the Trusted Root Certification Authorities tab, and include quite a few issuers from all over the world.

Figure 17:
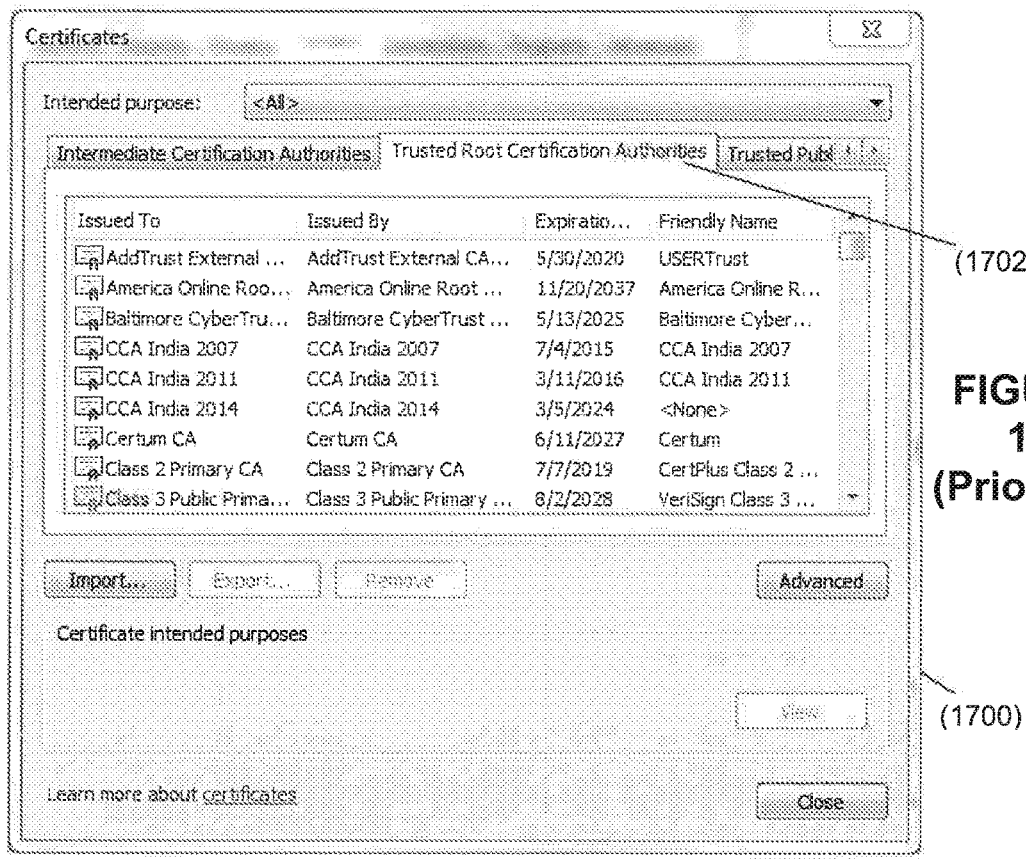
FIG. 17 is a Microsoft Windows dialogue box having a tab containing Trusted Root Certification Authorities for use in validating a digital certificate.

As an example, FIG. 17 is a Microsoft Windows dialogue box 1700 having a tab 1702 containing Trusted Root Certification Authorities for use in validating a digital certificate.

Figure 18:
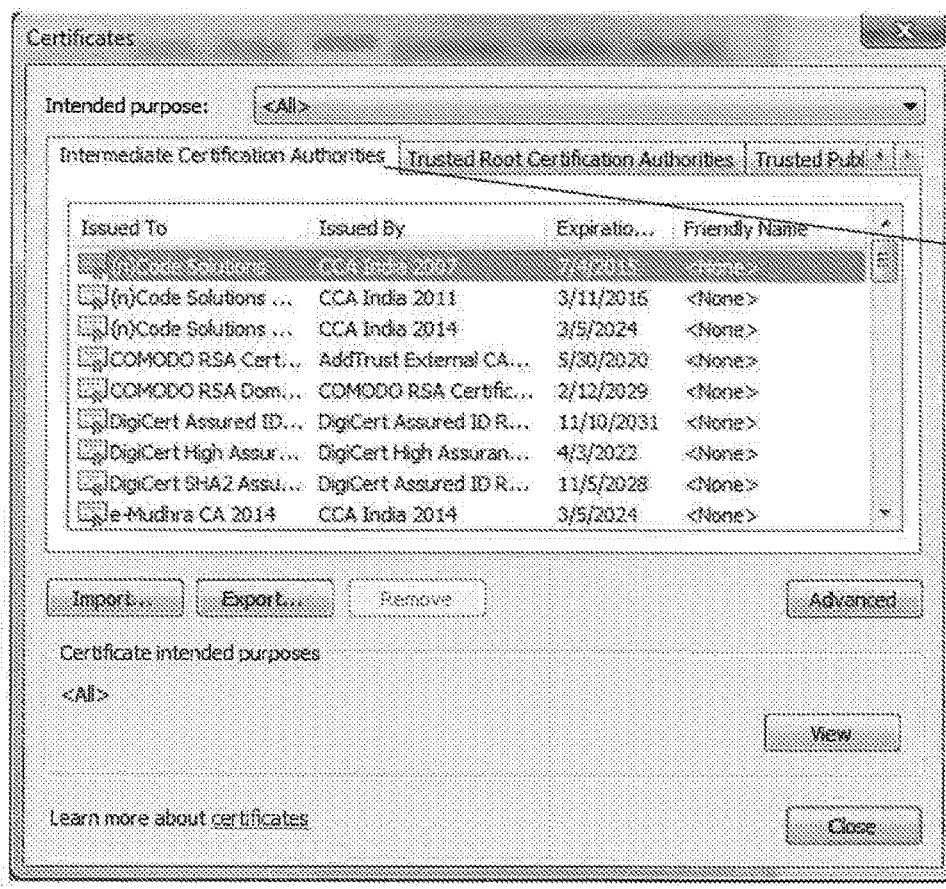
FIG. 18 is a Microsoft Windows dialogue box having a tab containing Intermediate Certification Authorities that chain up to some trusted root certification authorities for use in validating a digital certificate.

FIG. 18 is a Microsoft Windows dialogue box 1800 having a tab 1802 containing Intermediate Certification Authorities that chain up to some trusted root certification authorities for use in validating a digital certificate.

An application that uses the certificate database found in the Internet Explorer certificate manager will accept certificates that chain up to any one of these trusted roots. This is potentially dangerous. A paranoid user might go through these lists and eliminate any one they do not personally trust. These CA certificates can be updated or removed, or new ones added during Windows Update. One can also manage these certificates manually.

Figure 19:
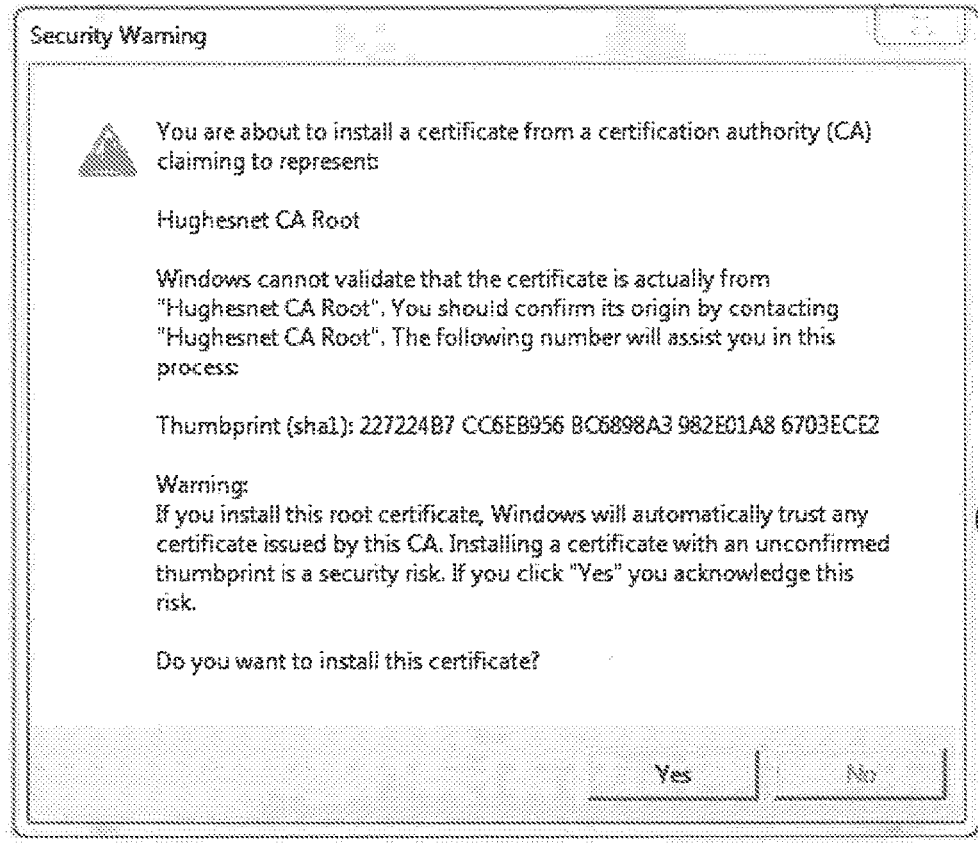
FIG. 19 is a Microsoft Windows dialogue box illustrating a strong warning displayed when installing a new root digital certificate from a particular certification authority.

Installing a new root certificate causes a strong warning to be displayed. FIG. 19 is a Microsoft Windows dialogue box illustrating a strong warning displayed when installing a new root digital certificate from a particular certification authority.

Figure 20:
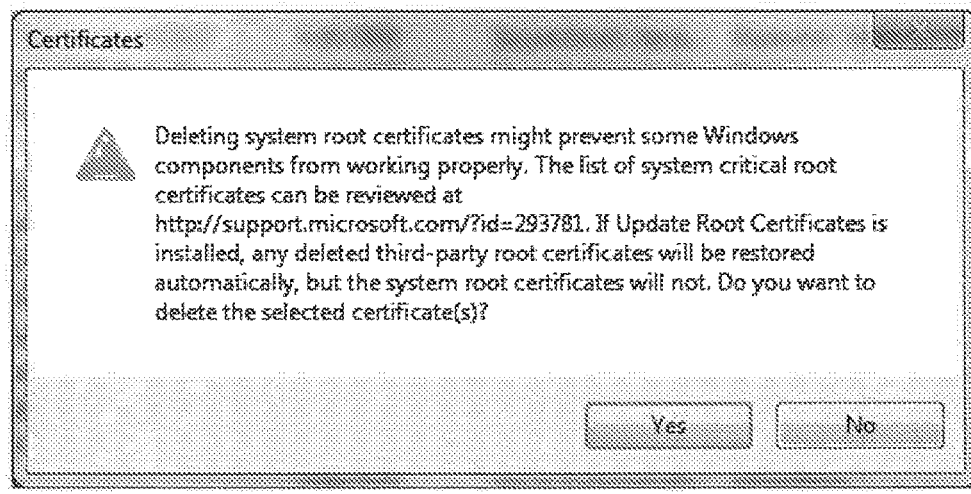
FIG. 20 is a Microsoft Windows dialogue box illustrating a warning displayed when removing a root digital certificate.

Removing a root certificate displays a warning. FIG. 20 is a Microsoft Windows dialogue box illustrating a warning displayed when removing a root digital certificate.

As with certificate revocation status checking, it is critical for all relying applications to check the validity of all certificates they use, or are presented by other apps. This is fairly straightforward for public hierarchy certificates. For private hierarchy certificates (ones whose root certificates are not pre-installed by the app vendor), there is the additional complexity of obtaining the root and intermediate certificates and installing them in the appropriate folders of the Microsoft certificate manager. There is further complication in that Mozilla apps use a completely different and incompatible certificate manager. Also, there is one set of certificate folders for the "Local System" account (for HKEY_LOCAL_MACHINE), and a different set for each Windows user account. If a user is logged in, the folders for the user's Windows account will be used. If the user is running a service under Local System account, the LocalMachine folders will be used. If the user is running a service under another service account, the folders for that service account will be used. When building trust chains, if the CA certificates are not found in the current user's folders, it will also look in the LocalMachine folders. To easily work with the various sets of folders, the user should use the Microsoft Management Console (MMC) certificate manager.

Hence, with regard to certificate revocation checking as discussed above, the conventional process is complicated enough that some apps choose not to do it.

However, an app making use of IRP simplifies the process. To perform revocation checking using IRP, a user can offload the complexity onto the DIR server enabled to use IRP. For certificates issued by that DIR server, one can specify the certificate name and it will find the certificate in the PKI_DB. For other certificates, a user can upload the entire certificate. The DIR server will determine certificate validity for a user without the user having to obtain root and intermediate certificates locally (although the user can download and install the necessary CA certificates for any certificate from DIR if the user wants to do this checking locally for better performance, and less overhead on the DIR server).

Offloading certificate validation onto the DIR server allows central management of trusted roots (controlled by the DIR administrator). The DIR server can obtain necessary root and intermediate certificates from other DIR servers and cache them locally.

Each DIR server has a server certificate for enabling TLS. This should be issued by a "real" trusted CA (ideally one that passes SAS70 audits), that has validated the organization and domain names carefully. In effect, if one trusts that certificate, one should trust the offloaded certificate validation as well. This makes DIR certificates as easy to use as "public hierarchy" certificates.

Digital Signing of Every Message in IRP

Another advanced feature of an application using IRP is the use of digital signatures on all messages between client and server. This is based on XML Digital Signatures, as specified at http://www.w3.org/TR/xmldsig-core/. This is used to detect tampering of messages, as well as providing sender authentication to the other end in every message. This prevents session hijacking (where a hacker breaks into a connection already established and authenticated, but continues the session with potentially bogus information). Normally authentication is done only once at the start of a TOP connection. It is more difficult to hijack an SSL/TLS secured session, but some of the recent SSL attacks can do this on older versions of SSL.

Adding a digital signature on every message provides a much higher level of security. It is similar to the "AH" (Authentication Header" mechanism of IPsec (RFC 4302—IP Authentication Header), but that is used on individual packets at layer 3 ("Internet layer"), while this application is in a layer 7 ("Application Layer" protocol). The IPsec AH uses only Hashed Message Authentication Code (HMAC) signatures for efficiency. Real digital signatures would have a severe impact on network throughput. HMAC signatures are specified in RFC 2104, "HMAC: Keyed-Hashing for Message Authentication". They are basically a "lightweight" form of digital signature that uses only message digest and symmetric key cryptography (no asymmetric key cryptography).

In an application using IRP, it is possible to choose whether full RSA digital signatures are used (and if so, what key length to use), or HMAC (similar to IP Authentication Header) is used. The difference in the client is not important, but on a server, real digital signatures could easily become a serious bottleneck. So with IRP, a server using IRP can specify which type of message signature to use. The client will use whichever signature type is requested by the server.

If real RSA, DSA or ECC based digital signatures are used, both parties must have public/private keypairs (the server must have a server certificate and the client must have a client certificate). Both ends sign with their private key and the other checks with the signer's public key. If HMAC based signatures are used, the symmetric key used is the same one exchanged during TLS handshake (so only the server needs a digital certificate to allow basic TLS handshake—the client side does not need to have a client certificate).

To the best of knowledge, this is the first application of digital signatures in each message of a protocol.

IRP Commands

IRP may include the following commands to enable its operations. These commands are exchangeable between servers and/or user devices (E.g. computers and/or mobile devices such as smartphones or tablets). The names of the commands are self-explanatory of their functions. More information on these commands will be provided when the practical aspects of IRP are illustrated later.

Connection and Authentication Requests
    Get_Capabilities
    STARTTLS
    UPA
    Quit Hierarchy Related Requests
    Get_Hierarchy_List
    Get_Hierarchy
    Get_CA_Certificates Note: IRP supports the creation of multiple CA hierarchies. So, for example, Get-Hierarchy_List returns a list of the CA hierarchies that are created. For example, CA_A, CA_B, and CA_C are created in a list. Each of the CA_A, CA_B, or CA_C will include a root CA, and a sub or intermediate CA.

User Related Requests
    Create_User
    Update_User
    Get_User_List
    Get_User
    Delete_User Node Related Requests (A "Node" refers to a server or a machine)
    Create_Node
    Update_Node
    Get_Node_List
    Get_Node
    Delete_Node Note: Node Related Requests provide for server certificate.

CSR Related Requests
    Get_CSR_List
    Get_CSR
    Put_CSR
    Delete_CSR

PrivateKey Related Requests
    Get_PrivateKey_List
    Get_PrivateKey
    Put_PrivateKey
    Delete_PrivateKey Certificate Related Requests
    Get_Certificate_List
    Get_Certificate
    Put_Certificate
    Delete_Certificate
    Renew_Certificate
    Revoke_Certificate
    Get_Certificate_Status PKCS12 Related Requests
    Get_PKCS12_List
    Get_PKCS12
    Put_PKCS12
    Delete_PKCS12

It is appreciated that no previous certificate management protocol is as comprehensive, or as secure.

IRP may involve use of one or more servers or computers to operate. IRP may be used from computers or mobile devices such as smartphones or tablets.

Practical Aspects of IRP

The following description focuses on practical aspects of the Identity Registration Protocol (IRP) and the services provided by an IRP server using IRP. There is also a comparison between a traditional web-based approach and an IRP-based approach according to examples of the present invention to deploying and implementing PKI (Public Key Infrastructure).

A description of the Internet landscape surrounding existing PKI deployments in the industry and market is first provided. Next, there is description on initial communication protocol handshake sequences in TLS 1.2 (Transport Layer Security version 1.2 is specified in RFC 5246) and IRP (Identity Registration Protocol) that are necessary to establish secure communications between a user's client device and the IRP server—Certification Authority (CA). A differentiation is made between using TLS with only server authentication and TLS with mutual (i.e. both server & client) authentication. The document then introduces UPA (User Password Authentication) as TLS with server authentication (i.e. server certificate) combined with password authentication, and SCA (Strong Client Authentication) as TLS with mutual authentication (i.e. server & client certificates).

An overall comparison is made between the traditional web-based and the IRP-based approaches from different application perspectives (including TLS/UPA/SCA from the security perspective).

Next, building onto the communication protocol handshake descriptions is a detailed description of a certificate enrollment process (i.e. the most important certificate lifecycle operation) inside a web-based and a IRP-based PKI setup. A comparison is then made for each certificate lifecycle operation (starting with certificate enrollment, renewal, revocation, backup/recovery) between the web-based and the IRP-based PKI setup.

Finally, the document makes a comparison of the existing certificate management (PKI) protocols, and introduces three essential features that IRP provides (i.e. user directory, PKI, address registry). It ends with a description of a typical IRP-based PKI deployment focusing on the distributed advantages, which IRP brings for the next generation (IPv6 based) Internet (i.e. distributed issuance of client certificates).

The Internet Landscape

The Internet is defined by its working protocols. TCP/IP (Transmission Control Protocol/Internet Protocol) is the language of the Internet. The original TCP/IP protocols were elementary. Security played no part in these protocols at the start. Therefore, TCP/IP has numerous security deficiencies.

Web protocol or HTTP (Hypertext Transfer Protocol) is an example of such protocol. It was designed without security concern from the start. Security features were built in later on. There are many vulnerabilities introduced by HTTP.

To request for a new certificate, a user has to communicate her request over the Internet using a working protocol. The traditional method uses the web-based communication between a user's web browser and the Certification Authority (CA) web server. A new method according to an example of the present invention uses an IRP-based communication between a user's client device and the IRP server. The two approaches are described below.

Web-based User Communication Between User's Web Browser & Web Server)

Web-based communication for digital certificate management is a traditional approach. With reference to FIG. 1 showing a flow diagram 100, a user's web browser 101, upon activation by a user, requests for a certificate from a CA web server 103 which replies with HTML (Hypertext Markup Language) contents. The communication channel between the user's web browser 101 and CA web server 103 is mostly secured using TLS 1.2 with server authentication (i.e. using server certificate). The exchanged protocol messages consist of: (1) standard TLS 1.2 handshake messages, and (2) specific web application messages, both transported via HTTP.

FIG. 1 shows a flow diagram 100 of a standard TLS 1.2 handshake and shows the interactions between the user's web browser 101 and the CA web server 103, when a user browses the CA web server's 103 web pages. Before the user initiates any transaction (e.g. to request a new certificate), the user's web browser 101 must establish a secure connection with the CA web server 103 on TCP port 443 (i.e. IANA assigned port number for HTTPS).

The user's web browser 101 begins a new handshake and submits its capabilities and preferences to the CA web server 103 in a TLS based ClientHello message 102. The CA web server 103 selects connection parameters and communicates them back in a TLS based ServerHello message 104. The CA web server 103 next sends its server certificate in a TLS based Certificate message 106 to the user's web browser 101. Depending on a selected key exchange (i.e. RSA key exchange or Diffie-Hellman-Merkle key agreement), the CA web server 103 sends additional information that is required for the key exchange to generate the master secret in a TLS based ServerKeyExchange message 108, before it indicates that it has sent all intended handshake messages in a TLS based ServerHelloDone message 110.

The user's web browser 101 also sends additional information that is required for the key exchange to generate the master secret in a TLS based ClientKeyExchange message 112. The user's web browser 101 then indicates in a TLS based ChangeCipherSpec message 114 that it has received sufficient information to construct the connection parameters, generate the encryption session keys, and is switching to encryption. Finally, the user's web browser 101 sends an encrypted message integrity value of the handshake messages it had sent and received in a TLS based Finished message 116. The user's web server 101 also indicates in a TLS based ChangeCipherSpec message 118 that it has received sufficient information to construct the connection parameters, generate the encryption keys, and is switching to encryption. Finally, the user's web server 101 sends a message integrity value of the handshake messages it had sent and received in a TLS based Finished message 119. After the TLS based Finished message 119, secure connection is established (i.e both sides have switched over to encryption). Both the user's web browser 101 and the CA Web server 103 can begin to send encrypted application data. Secure messages 120 are sent from the user's web browser 101 to the CA web server 103 and secure messages 122 are sent from the CA web server 103 to the user's web browser 101 via the established secure connection. At the end of the conversations, the User's web browser 101 decides to close the connection and send a TLS based CloseNotify alert message 124. The CA web server 103, upon receiving the alert 124, discards any pending writes and sends a TLS based CloseNotify alert message 126 of its own. If any secure message arrives after these alert messages 124 and 126, they are ignored.

IRP-based User Communication Between User's Client Device & IRP Server

In IRP-based communication for digital certificate management, a user's client device 203 requests for a certificate from an IRP server 205 via IRP over TLS 1.2. IRP is a protocol designed with strong security at the start. It can be a text-based, application layer (i.e. layer 7) protocol. It can contain comprehensively defined protocol messages in XML (Extensible Markup Language) format that are semantically related to the three essential features listed below. It is important to take note that there is currently no application layer protocol that provides the following features (provided by IRP). These essential features are described in details in a later section:

1. Distributed user identity directory
2. Comprehensive distributed certificate management (or PKI) protocol
3. Real-time IPv6 address location registry If the user has no certificate, the communication channel between the user's client device 203 and the IRP server 205 is secured using both TLS with server authentication and password authentication. This combined authentication method is termed as UPA (User Password Authentication) and involves an account's password.

If a user 201 has a certificate, the communication channel between the user's client device 203 and the IRP server 205 is secured using TLS with mutual authentication (i.e. both server and client authentications). This authentication method is termed as SCA (Secure Client Authentication) and involves a client certificate.

The exchanged protocol messages consist of: (1) standard TLS 1.2 handshake messages, and (2) specific application (IRP) messages, both transported using Transmission Control Protocol (TCP).

Figure 2:
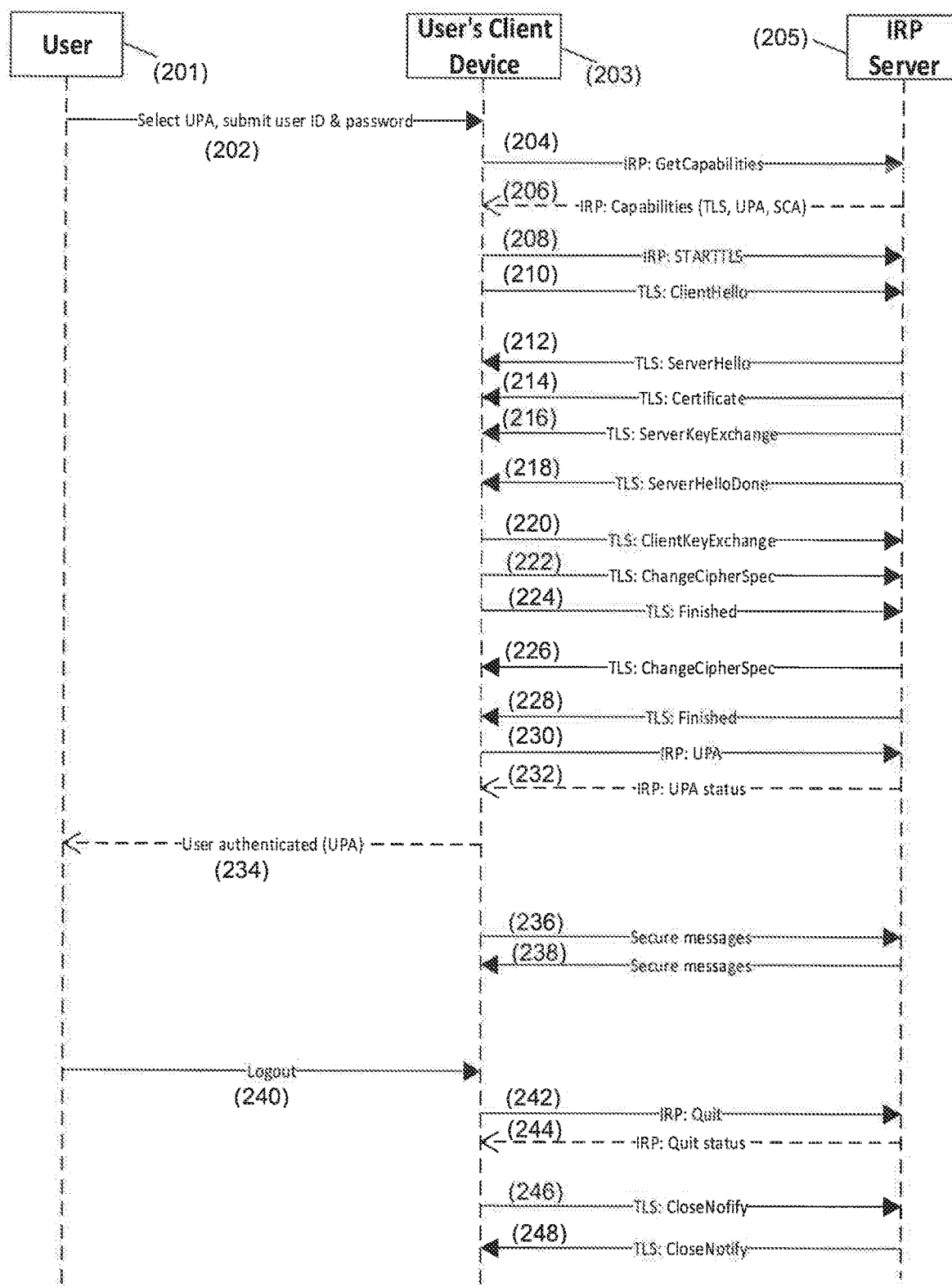
FIG. 2 is a flow diagram illustrating TLS 1.2 handshake with Server Authentication & Password Authentication according to an example of the present disclosure.

FIG. 2 shows a flow diagram 200 of the interactions between a client device 203 and IRP server 205, when a user 201 with no digital certificate with the IRP server 205 launches an IRP client application on the client device 203. Before the user 201 initiates any transaction (e.g. to request a new certificate), the client device 203 must establish a secure connection with the IRP server 205 on TCP port 4604 (i.e. IANA assigned port number for IRP). In general, port 4604 is used for IRP with or without TLS. In contrast, port 80 and 443 are used for HTTP without TLS and HTTP with TLS respectively. There is no separate port for IRP over TLS as it uses TLS in explicit mode.

A user 201 launches the IRP client application and initiates an UPA logon. She enters her user ID & password credentials and clicks on a Logon button at a step 202 through the client device 203. In order for the user 201 to do this, the user has to first register an account with the IRP server 205 via the client application on the client device 203. The (client application on the) client device 203 sends a GetCapabilities IRP XML message 204 to the IRP server 205, which replies with an IRP capabilities message 206 indicating: (1) if the IRP server 205 can establish a secure TLS connection (i.e. TLS), (2) if the IRP server 205 can support password authentication (i.e. UPA), and (3) if the IRP server 205 can support client certificate authentication (i.e. SCA). It can be up to an owner of the IRP server 205 or the user 201 to set what capabilities the IRP server 205 supports. However, to enable secure communication, the IRP server 205 needs to have at least one way to establish a secure connection for secure data communication and at least one way for authenticating the user 201.

With the IRP server's 205 indication of TLS support in the present example, the client device 203 sends a StartTLS IRP XML message 208 to start a new handshake. This is followed by a series of message exchanges (from TLS based ClientHello message 210 to TLS based Finished message 228), similar to that exchanged between the web browser 101 in FIG. 1 and CA web server 103 in FIG. 1 with server authentication. Every message exchange after the StartTLS IRP XML message 208 is standard TLS in explicit mode. Standard TLS in explicit mode includes a TLS based ClientHello message 210, a TLS based ServerHello message 212, a TLS based Certificate message 214 for sending a digital certificate to the user's client device 203, a TLS based ServerKeyExchange message 216, a TLS based ServerHelloDone message 218, a TLS based ClientKeyExchange message 220, a TLS based ChangeCipherSpec message 222 from the user's client device 203 to the IRP server 205, a TLS based Finished message 224 from the user's client device 203 to the IRP server 205, a TLS based ChangeCipherSpec message 226 from the IRP server 205 to the user's client device 203, and a TLS based Finished message 228 from the IRP server 205 to the user's client device 203. These messages correspond to and have the same functions as the messages with reference numerals 102, 104, 106, 108, 110, 112, 114, 116, 118, and 119 in FIG. 1 respectively.

After the TLS based Finished message 228, a secure connection is established (i.e. client side has switched over to encryption). With the IRP server's 205 indication of UPA support through the IRP Capabilities message 206, the client device 203 can proceed to send a UPA IRP XML message 230 with the user's 201 credentials submitted at step 202 to the IRP server 205, which replies with the status of the user authentication (i.e. successful or unsuccessful). The client device 203 then indicates perhaps via a text message at a step 234 on a display of the client device 203 to the user 201 that she is authenticated or not authenticated by the IRP server 205. If the user 201 is authenticated, the user 201 is then allowed to initiate a transaction to, for example, request for a new digital certificate from the IRP server 205. Secure messages 236 and 238 for requesting the new certificate and sending of the new certificate between the client device 203 and the IRP server 205 can then be exchanged. At the end of the conversations i.e. the exchange of the Secure messages 236 and 238, the user 201 initiates a logout at a step 240 via a user interface of the client device 203. The client device 203 then sends a Quit IRP XML message 242 to the IRP server 205, ending the session. The IRP server 205 replies with a Quit status message 244. This is followed by exchange of TLS based CloseNotify messages 246 and 248 between the client device 203 and the IRP server 205 to close the connection. If any message arrives after these messages, they are ignored by the client device 203 and the IRP server 205.

Figure 3:
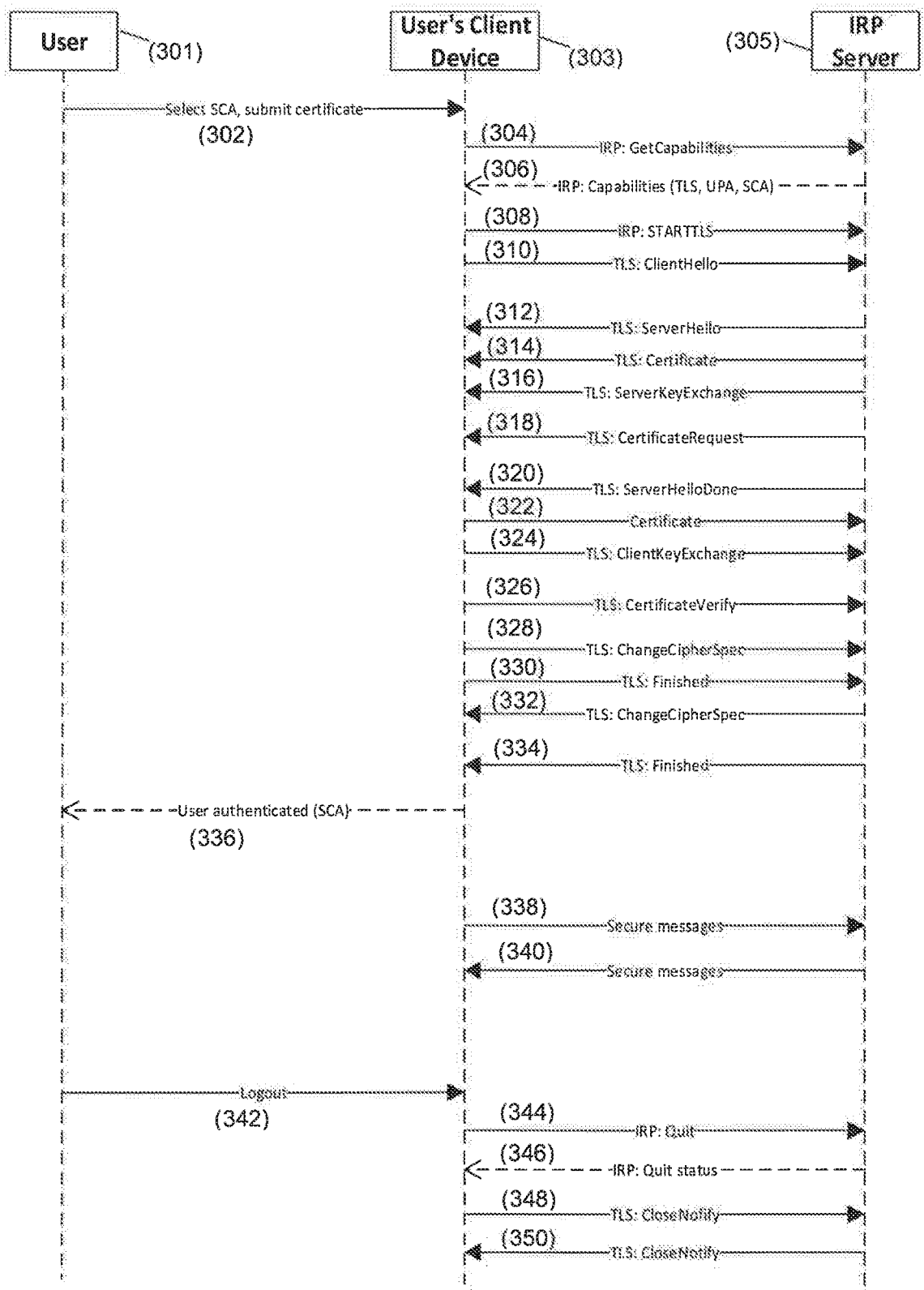
FIG. 3 is a flow diagram illustrating TLS 1.2 handshake with Mutual Server Client Authentication according to an example of the present disclosure.

FIG. 3 shows a flow diagram 300 of the interactions between a user's client device 303 and an IRP server 305, when a user 301 with a digital certificate with the IRP server 305 launches an IRP client application on the client device 303. Before the user 301 initiates any transaction (e.g. to request a new digital certificate), the client device 303 must establish a secure connection with the IRP server 305 on TCP port 4604 (i.e. IANA assigned port number for IRP). In general, port 4604 is used for IRP with or without TLS. In contrast, port 80 and 443 are used for HTTP without TLS and HTTP with TLS respectively. There is no separate port for IRP over TLS as the IRP Server 305 uses TLS in explicit mode.

A user 301 launches the IRP client application and initiates a SCA logon. She selects her digital certificate and clicks on the Logon button at a step 302. The (client application on the) client device 303 sends a GetCapabilities IRP XML message 304 to the IRP server 305, which replies with an IRP capabilities message 306 indicating: (1) if the IRP server 305 can establish a secure TLS connection (i.e. TLS), (2) if the IRP server 305 can support password authentication (i.e. UPA), and (3) if the IRP server 305 can support client certificate authentication (i.e. SCA).

With the IRP server's 305 indication of TLS support in the present example, the client device 303 sends a StartTLS IRP XML message 308 to start a new handshake. This is followed by a series of message exchanges (from TLS based ClientHello message 310 to TLS based Finished message 334), similar to that exchanged between the web browser 101 in FIG. 1 and CA web server 103 in FIG. 1 with server authentication, with the exception that the exchanges now have both server and client authentication (i.e. mutual authentication). Every message exchange after the StartTLS IRP XML message 308 is standard TLS in explicit mode. Standard TLS in explicit mode includes a TLS based ClientHello message 310, a TLS based ServerHello message 312, a TLS based Certificate message 314, a TLS based ServerKeyExchange message 316, a TLS based ServerHelloDone message 320, a TLS based ClientKeyExchange message 324, a TLS based ChangeCipherSpec message 328 from the user's client device 303 to the IRP server 305, a TLS based Finished message 330 from the user's client device 303 to the IRP server 305, a TLS based ChangeCipherSpec message 328 from the IRP server 305 to the user's client device 303, and a TLS based Finished message 334 from the IRP server 305 to the user's client device 303. These messages correspond to and have the same functions as the messages with reference numerals 210, 212, 214, 216, 218, 220, 222, 224, 226, and 228 in FIG. 2 respectively.

There is a difference between FIG. 3 and FIG. 2 in that after sending the TLS based ServerKeyExchange message 316, the IRP server 305 requests for client authentication in a Certificate Request message 318 before sending the TLS based ServerHelloDone message 320. With the IRP server's 305 indication of SCA support in the IRP capabilities message 306, the client device 303 proceeds to send the certificate selected and submitted by the user 301 at the step 302 to the IRP server 305 in a Certificate message 322. After sending the ClientKeyExchange message 324, the client device 303 proves the possession of the private key (corresponding to the public key in the client certificate sent previously) by sending a signature of all the handshake messages exchanged at this point in a CertificateVerify message 326. After the TLS based Finished message 330 from the client device 303 to the IRP server 305, the secure connection is established (i.e. both sides have switched over to encryption). The client device 303 indicates to the user 301 that she is authenticated at a step 336. The user 301 is then allowed to initiate any PKI transaction and Secure messages 338 and 340 relating to initiation of any PKI transaction are exchanged between the client device 303 and the IRP server 305. At the end of the conversations i.e. the exchange of the Secure messages 338 and 340, the user 301 initiates a logout at a step 342. The client device 303 then sends a Quit IRP XML message 344 to the IRP server 305, ending the session. The IRP server 305 replies with an IRP Quit status message 346. This is followed by exchanges of TLS based CloseNotify messages 348 and 350 to close the connection. If any message arrives after these messages, they are ignored by the client device 303 and the IRP server 305.

Comparison on Application Perspectives (Web Vs IRP-based PKI Approach)

Table 1 below shows a comparison made between traditional web-based and IRP-based approaches for digital certificate management on different application perspectives.

| Web-based PKI Approach | IRP-based PKI Approach |
| --- | --- |
| Security Perspective | |
| As web browser vendors attempt to fix many new security vulnerabilities found in HTTP/HTML now and then. This causes the web browsers to change implementation and features frequently, and results in large variations between (the different releases of) the browsers. | IRP is designed using strong authentication (i.e. TLS with server & client authentication) from the start and does not involve HTTP, which has much security vulnerabilities. |
| It is not secure when a user (with no certificate) uses only at most TLS with server authentication to initiate a new certificate request from a CA. (FIG. 1) | It is relatively secure when the user (with no certificate) uses a combined TLS with server authentication & password authentication to initiate a new certificate request from a CA. (See FIG. 2) It is more secure when the user (with a valid CA signed certificate) uses TLS with mutual authentication (both server & client authentication) to do other PKI transactions with the CA. (See FIG. 3) |
| Application Protocol Perspective | |
| Certificate enrollment (and other PKI operations) is not defined in any form of application protocol. Existing web applications use different incompatible message formats to represent a request between a user's web browser and a CA's web applications. | Certificate enrollment (and other PKI operations) is comprehensively defined in semantic within the XML structure of the IRP. This allows compatibility between IRP client and server applications, and reduces interoperability issues arising from interpreting message contents. |

| Web-based PKI Approach | IRP-based PKI Approach |
|---|---|
| User Interface Perspective | |
| Web interfaces are difficult to use on mobile devices with limited screen size and somewhat crude pointing devices. Web browsers on the mobile devices lack in features compared to web browsers available for Windows & OS-X. It is difficult to do advanced PKI and security via web on both mobile & desktop platforms. | Current and future applications developed for mobile devices are shifting to native-based interfaces (e.g. Android/iOS apps). They are optimised for mobile devices and not affected by problems inflicting conventional Web browsers. A client application using IRP on a client device can be configured to operate based on such native-based interfaces. |
| Application Performance Perspective | |
| Use of simple web scripts (e.g. PHP) to implement the server-side of web application (which produces web contents in HTML accessed via HTTP transport). The scripts on the web pages are not designed to create a responsive and user-friendly, interactive UX (user experience). HTML was designed more for representing static text and image objects, and not for creating a user interface. Both the (unimportant) user interface and the critical application messages have to traverse the network to the user's browser, using more network bandwidth. The user has an overall poor UX and application responsiveness. Use of simple HTTP GET, PUT, or POST mechanism to transport HTML contents. | IRP Applications use more powerful and sophisticated language (e.g. C++, C#) to implement both client & server applications (accessed via standard TCP transport). Native program (e.g. based on Windows Form) using IRP is designed to create highly interactive GUI. It utilizes local processing power and the high bandwidth with local video display. Only critical protocol messages are traversing through the network to the user's client program, using less network bandwidth. The user has an overall richer UX and application responsiveness. Use of efficient and powerful TCP mechanism to transport IRP XML messages. |
| Platform Independence Perspective | |
| Platform independence is achieved by a user accessing a web-based server from a computer of any platform with a web browser installed. | Platform independence is achieved through IRP by the native framework being ported to various platforms (e.g. Net environment has Mono for Linux, and Xamarin for OS-X/iOS/Android; IRP Application developed in C# for Windows is portable to other platforms supporting .Net). |

Request New Certificate (Web-based PKI)

Figure 4:
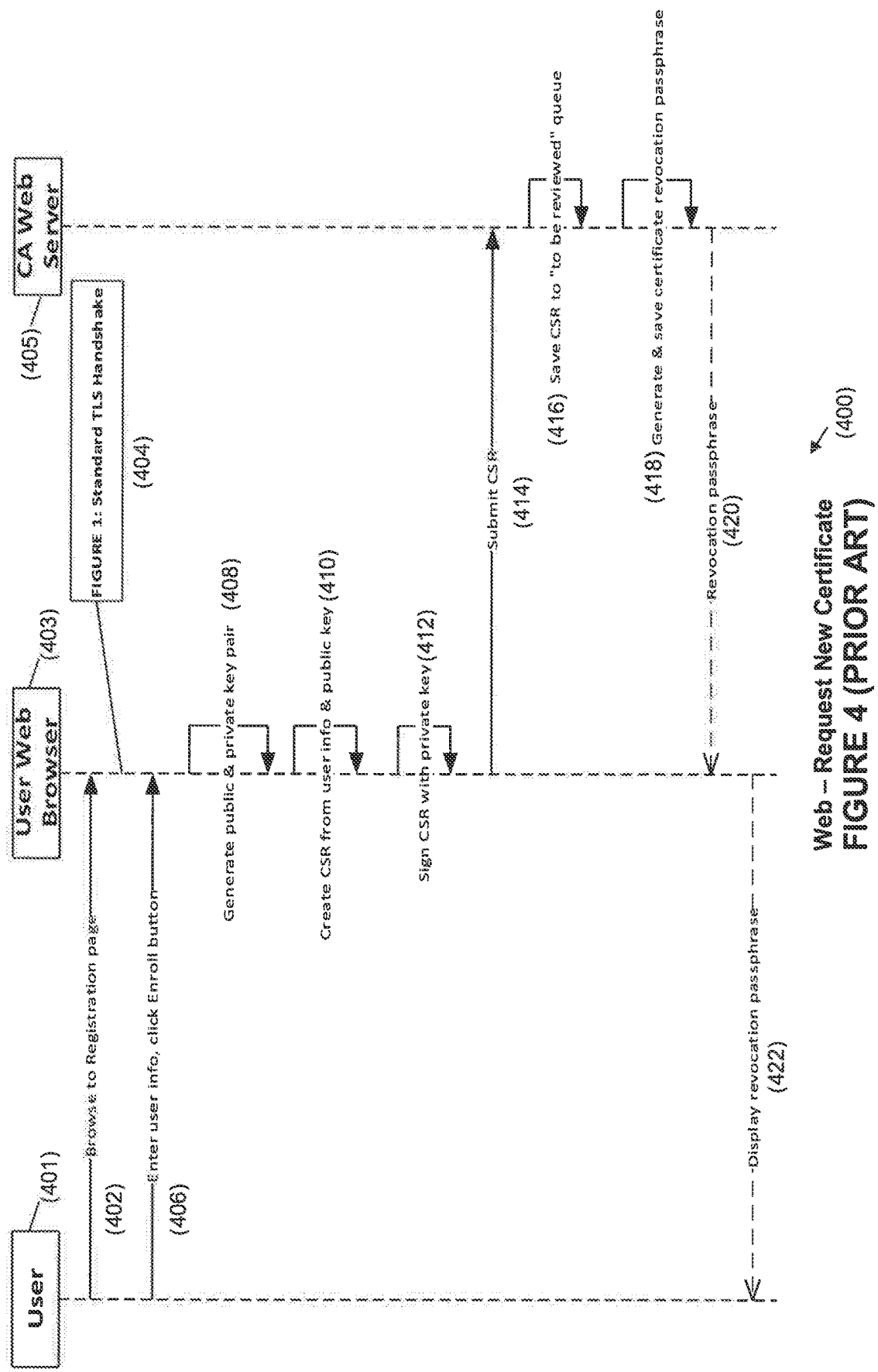
FIG. 4 is a flow diagram illustrating existing web-based infrastructure for requesting a new digital certificate.

Certificate enrollment is the most complex lifecycle operation in a PKI setup. FIG. 4 shows a conventional flow diagram 400 of interactions between a user web browser 403 and a CA web server 405, when a user 401 browses through a user interface to a registration page of web pages hosted by the CA web server 405 at a step 402. The user interface (for certificate requests) is implemented as a web application (on the CA web server 405) accessed from the user's web browser 403.

After carrying out a standard TLS handshake 404 illustrated by the flow diagram 100 in FIG. 1, the user 401 initiates a transaction to request for a new certificate by entering her user information, and clicks an Enroll button to request for her digital certificate at a step 406. Thereafter, the web browser 403 does the following:

Generate a public & private key pair for the user at a step 408;
Create a CSR (Certificate Signing Request) from the user information & the generated public key at a step 410;
Sign the CSR using the generated private key at a step 412; and
Submit the self-signed CSR to the CA web server (via a HTTP POST) for processing at a step 414.
Subsequently, the CA web server 405 does the following:
Save the received CSR to a "to be reviewed" queue for further processing at a step 416;
Generate and save the user's 401 revocation passphrase at a step 418; and
Return the user's revocation passphrase for display to the user 401 at a step 420.

The revocation passphrase is then displayed to the user at a step 422.

Figure 5:
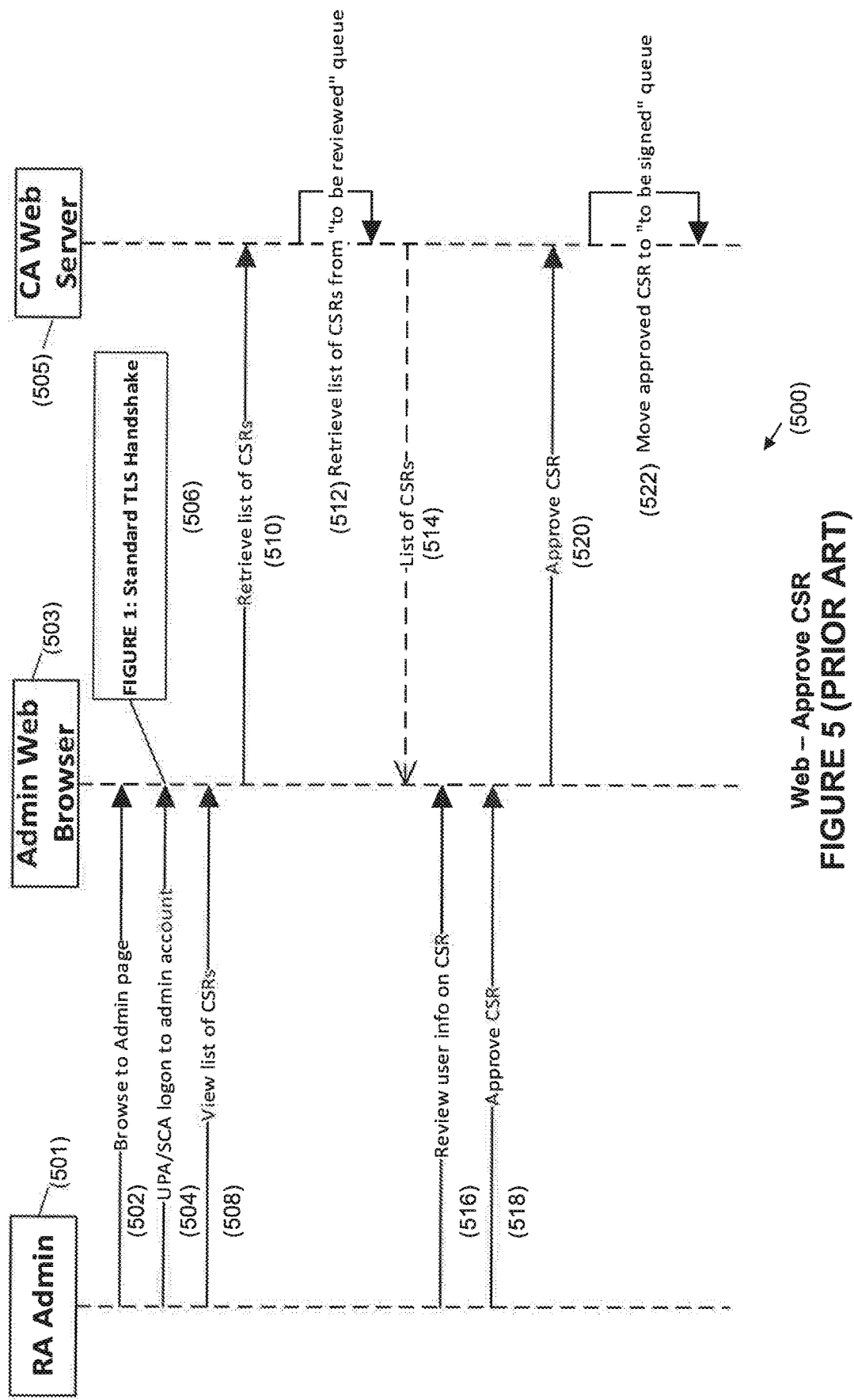
FIG. 5 is a flow diagram illustrating existing web-based infrastructure for approving a Certificate Signing Request (CSR).

FIG. 5 shows a conventional flow diagram 500 of interactions between an administrator's web browser 503 and a CA web server 505, when an RA (Registration Authority) administrator 501 browses through an administrator's interface to an administration page hosted by the CA web server 505 at a step 502. The administrator's interface (for reviewing & approving certificate requests) is implemented as a web application accessed from the administrator's web browser 503.

After carrying out the standard TLS handshake 506 illustrated by the flow diagram 100 in FIG. 1, the administrator 501 logon to her admin account (UPA or SCA) at a step 504. She then initiates transactions through the administrator's web browser 503 to approve a list of CSRs.

The administrator 501 selects to view the list of CSRs at a step 508 through the Administrator's web browser 503. The web browser 503 then retrieves the list of CSRs from the CA web server 505 at a step 510. The CA web server 505 retrieves the list of CSRs from a "to be reviewed" memory queue accessible to the web server 505 at a step 512. Once retrieved, the list of CSRs is sent to the Administrator's Web Browser 503 at a step 514. The RA administrator then manually reviews through the Administrator's Web Browser 503 the correctness and currency of user information in each CSR at a step 516, and approves each CSR based on an approval policy of the CA at a step 518. Upon a CSR approval selected by the administrator 501 through the Administrator's web browser 503, an approve CSR message 520 is sent from the Administrator's web browser 503 to the CA web server 505. The CA web server 505 then moves the CSR from a "to be reviewed" queue to a "to be signed" memory queue accessible to the CA web server 505 at a step 522.

Figure 6:
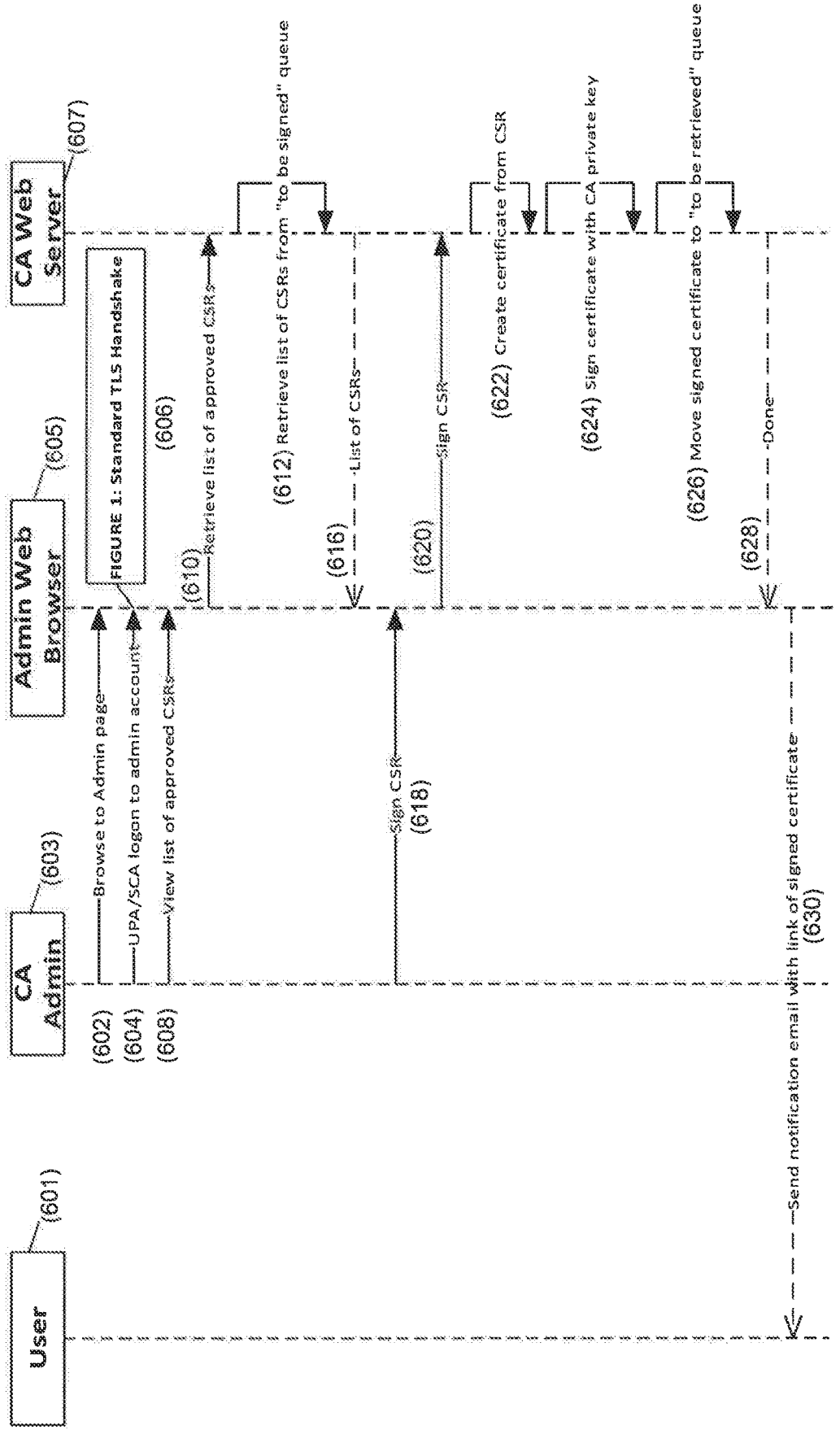
FIG. 6 is a flow diagram illustrating existing web-based infrastructure for signing a CSR.

FIG. 6 shows a conventional flow diagram 600 of interactions between an administrator's web browser 605 and a CA web server 607, when a CA administrator 603 browses through an administrator's interface to an administration page hosted by the CA web server 607 at a step 602. The administrator's interface (for signing certificate requests) is implemented as a web application accessed from the administrator's web browser 605.

After carrying out a standard TLS handshake 606 illustrated by the flow diagram 100 in FIG. 1, the CA administrator 603 logon to her administrator account via, for example, procedures similar to UPA or SCA, at a step 604. She then initiates through the Administrator's web browser 605 transactions to sign approved CSRs originating from, for instance, a user 601.

The CA administrator 603 selects to view a list of approved CSRs at a step 608 through the Administrator's web browser 605. The web browser 605 then retrieves the list of approved CSRs from the CA web server 607 at a step 610. The CA web server 607 retrieves the list of approved CSRs from a "to be signed" memory queue accessible to the web server 607 at a step 612. Once retrieved, the list of approved CSRs is sent to the Administrator's Web Browser 605 at a step 616. The CA administrator 603 views the retrieved list of approved CSRs on a console of a PKI administration program. She executes a signing on each approved CSR at a step 618. Upon the CSR signing execution, a CSR signing message 620 is sent from the Administrator's web browser 605 to the CA web server 607. After receiving the CSR signing message 620, the CA web server 607 does the following:

Create a certificate from the approved CSR to be signed at a step 622;
Sign the certificate with a CA private key at a step 624; and
Move the signed certificate from the "to be signed" queue to a "to be retrieved" queue at a step 626.

After each certificate signing has completed and notified by the CA web server 607 to the Administrator web browser 605 at a step 628, the PKI administration program sends a notification email to the user 601 (with a link of the signed certificate for download) at a step 630 to notify that her certificate had been approved and signed.

Figure 7:
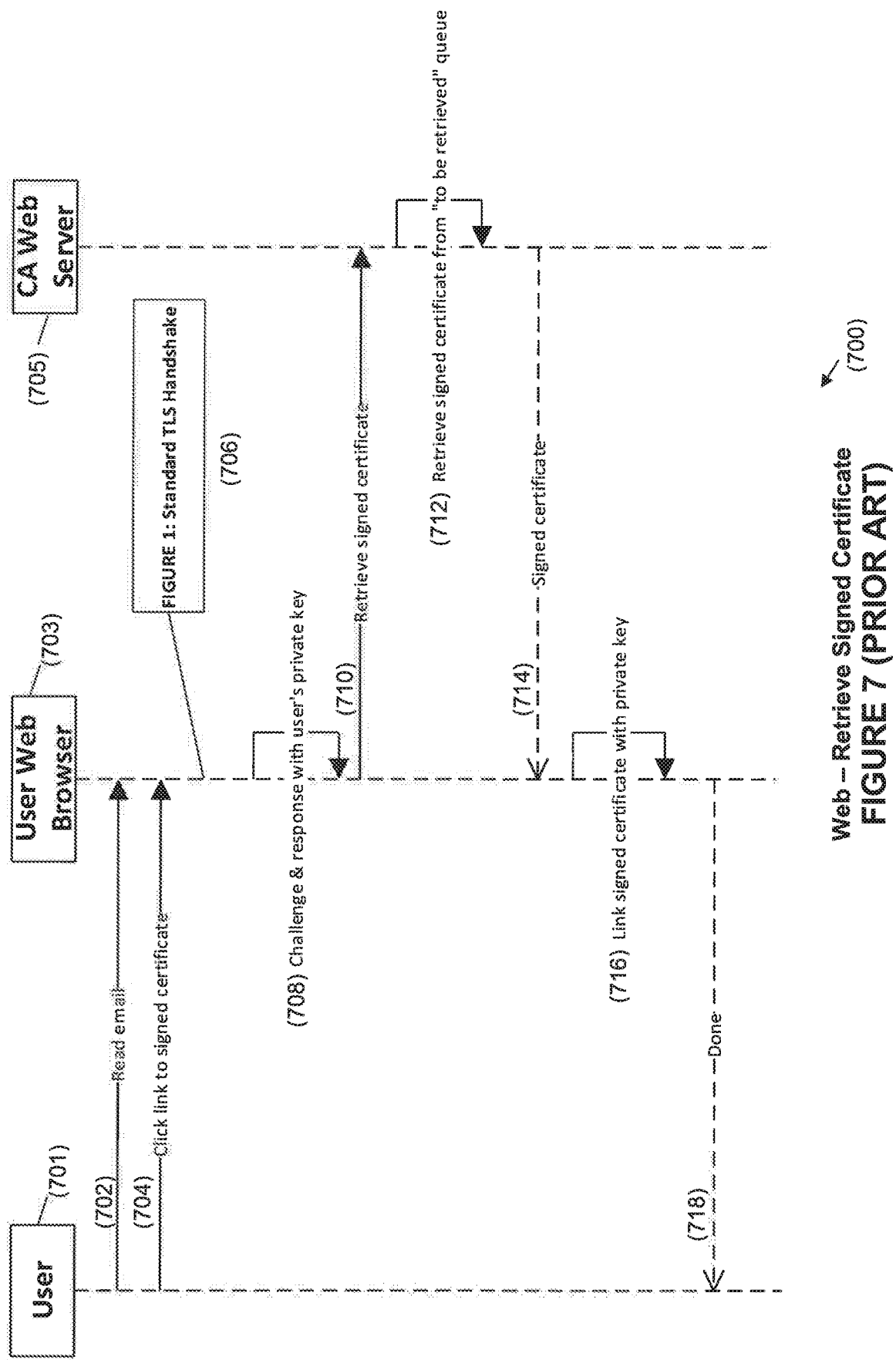
FIG. 7 is a flow diagram illustrating existing web-based infrastructure for retrieving a signed certificate.

FIG. 7 shows a conventional flow diagram 700 of interactions between a user's web browser 703 and a CA web server 705, when a user 701 retrieves her signed certificate. After carrying out a standard TLS handshake 706 illustrated by the flow diagram 100 in FIG. 1, the user 701 initiates a transaction to retrieve her signed certificate. There is no user authentication involved.

The user reads her email at a step 702, and clicks on a link in the email to download her signed certificate at a step 704. The web browser 703 does a cryptographic challenge and response at a step 708 to verify that the user's 701 corresponding private key in the browser's 703 certificate storage is correct. The user 701 has to be careful to ensure that the same computer and browser used to apply for the certificate is used to retrieve the signed certificate. Otherwise, the user's 701 corresponding private key will not be present in the browser's 703 certificate storage, and the cryptographic challenge & response will fail. The web browser 703 retrieves the signed certificate from the web server 705 at a step 710. The web server 705 retrieves the signed certificate from a "to be retrieved" memory queue accessible to the web server 705 at a step 712. The retrieved signed certificate is sent from the web server 705 to the web browser 703 at a step 714. The web browser 703 then links the signed certificate with the corresponding private key in the certificate storage in the browser 703 at a step 716. At a step 718, completion of retrieval of a signed certificate is notified to the user 701 through a user interface used for accessing the web browser 703.

Request New Certificate (IRP-based PKI)

The IRP protocol enables automation in a certificate provisioning process. Traditional web browser users have to manually click through a few web pages to fill in their user information, generate a user key pair, submit a CSR request, and retrieve their signed certificates. With IRP protocol, a (client application on a) client device automatically performs every PKI operation after a user's single click to enroll a certificate.

Figure 8:
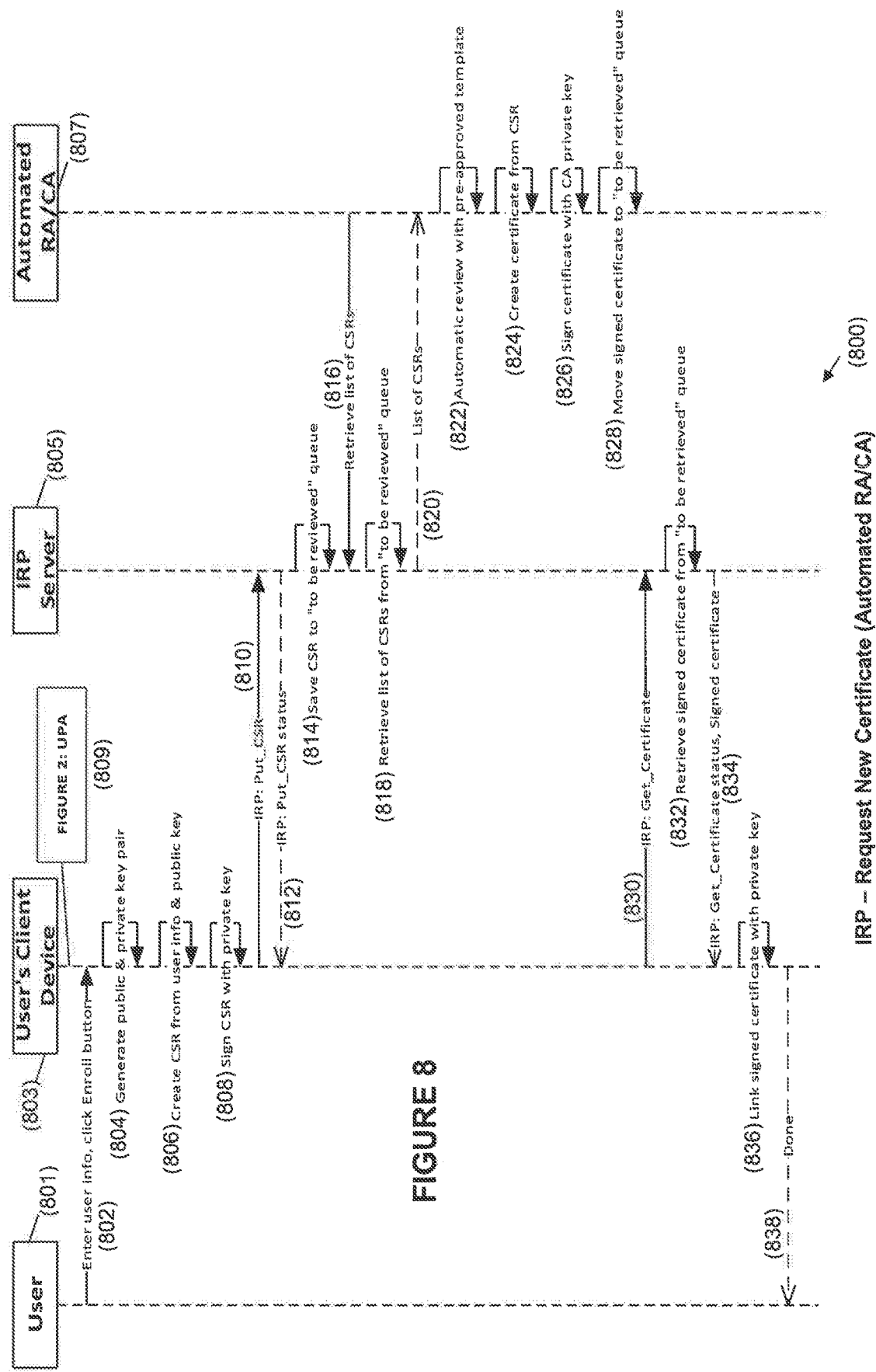
FIG. 8 is a flow diagram illustrating infrastructure for requesting a new digital certificate from automated Registration Authority (RA)/Certification Authority (CA) according to an example of the present disclosure.

FIG. 8 shows a flow diagram 800 of interactions between a user's client device 803 and an IRP server 805 for an automated RA/CA process 807. A user 801 (with no certificate) launches an IRP client application on the device 803. The user account had been created and the password was made known to the user 801. After UPA (i.e. standard TLS with server authentication and password authentication), the user 801 initiates a transaction to request for a new certificate.

After the user 801 is authenticated using UPA illustrated by the flow diagram 200 in FIG. 2 at a step 809, she enters her user information, and clicks an Enroll button in a user interface of the user's client device 803 to request for her certificate at a step 802. The client device 803 then does the following:

Generate a public and private key pair for the user 801 at a step 804;
Create a CSR from the user information entered and the generated public key at a step 806;
Sign the CSR using the generated private key at a step 808;
Submit the self-signed CSR to the IRP server 805 via an IRP Put_CSR message 810 for processing.

After indicating receipt of the IRP Put_CSR message 810 to the user's client device 803 via an IRP Put_CSR status message 812, the IRP server 805 saves the received CSR to a "to be reviewed" memory queue accessible to the IRP server 805 for further processing at a step 814. The automated RA/CA process 807 is a scheduled task that runs at a regular interval (e.g. every 30 seconds) to poll the "to be reviewed" queue accessible to the IRP server 805 at a step 816 to retrieve a list of CSRs from the "to be reviewed" queue. After each poll, the IRP server 805 retrieves the list of CSRs from the "to be reviewed" queue at a step 818. The list of CSRs from the "to be reviewed" queue is then passed to the automated RA/CA process 807 for processing at a step 820. For each CSR retrieved from the IRP server 805, the automated RA/CA process 807 does an automatic review based on a pre-approved authentication template at a step 822. Upon approval of a CSR, the automated RA/CA process 807 does the following:

Create a certificate from the approved CSR at a step 824;

Sign the certificate with a CA private key at a step 826;

Move the signed certificate from the "to be reviewed" queue to a "to be retrieved" memory queue accessible to the IRP server 805 at a step 828.

The client device 803 also does retrieval of the signed certificate via an IRP Get_Certificate message 830 at a regular interval (e.g. every 30 seconds). After receiving the IRP Get Certificate message 830, the IRP server 805 retrieves the signed certificate from the "to be retrieved" queue at a step 832. The IRP server 805 returns the signed certificate back with an IRP Get_Certificate status message 834, and the client device 803 does a link of the signed certificate with the corresponding private key in a certificate storage accessible to the user's client device 803 at a step 836. At a step 838, completion of retrieval of the signed certificate is notified to the user 801 through a user interface on the user's client device 803.

Figure 9:
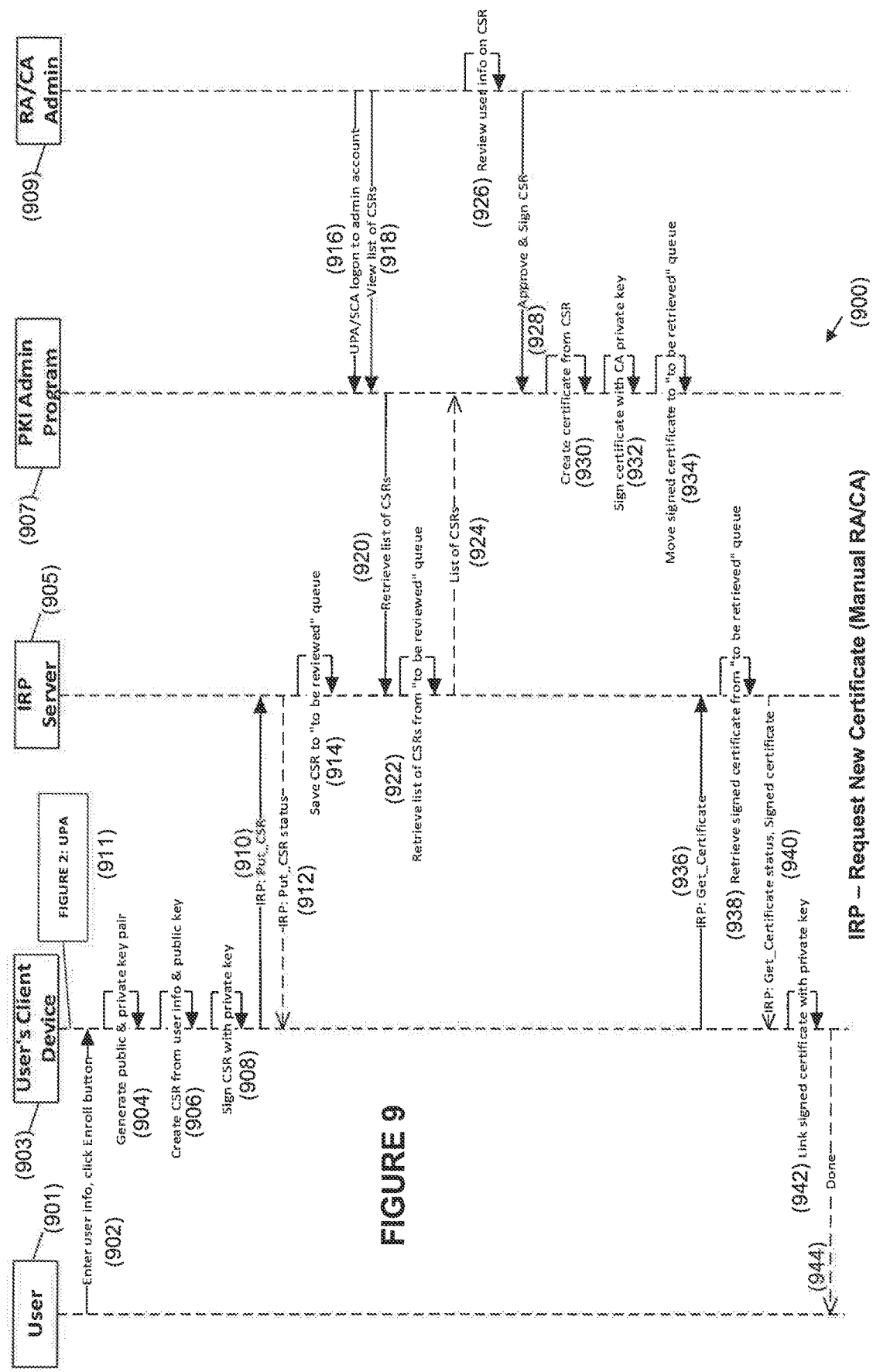
FIG. 9 is a flow diagram illustrating infrastructure for requesting a new digital certificate manually from Registration Authority (RA)/Certification Authority (CA) according to an example of the present disclosure.

FIG. 9 shows a flow diagram 900 of interactions between a user's client device 903 and an IRP server 905 for a manual RA/CA process 907. A user 901 (with no certificate) launches an IRP client application on the device 903. The user account had been created and the password was made known to the user 901. After UPA (i.e. standard TLS with server authentication and password authentication), the user 901 initiates a transaction to request for a new certificate.

After the user 901 is authenticated using UPA illustrated by the flow diagram 200 in FIG. 2 at a step 911, she enters her user information, and clicks an Enroll button in a user interface of the user's client device 903 to request for her certificate at a step 902. The client device 903 then does the following:

Generate a public and private key pair for the user 901 at a step 904;

Create a CSR from the user information entered and the generated public key at a step 906;

Sign the CSR using the generated private key at a step 908;

Submit the self-signed CSR to the IRP server 905 via an IRP Put_CSR message 910 for processing.

After indicating receipt of the IRP Put_CSR message 910 to the user's client device 903 via an IRP Put_CSR status message 912, the IRP server 905 saves the received CSR to a "to be reviewed" memory queue accessible to the IRP server 905 for further processing at a step 914.

An RA/CA administrator 909 launches a PKI administration program 907 and carries out a UPA/SCA logon to her administrator account at a step 916. The PKI administration program 907 is a program executed on a computer or similar device of the RA/CA administrator 909 that can interact with the IRP server 905. The RA/CA administrator 909 then manually selects to view a list of CSRs at step 918. Thereafter, the PKI administration program 907 sends a request to retrieve the list of CSRs to the IRP server 905 at a step 920. Upon receiving the request to retrieve the list of CSRs, the IRP server 905 retrieves the list of CSRs from the "to be reviewed" queue at a step 922. The retrieved list of CSRs is sent from the IRP server 905 to the PKI administration program at a step 924. The RA/CA administrator 909 reviews user information of each CSR and proceeds to approve and sign the CSRs if the CSRs fulfil approval policy of the RA/CA at a step 928. Upon the approval of a CSR, the PKI administration program 907 does the following:

Create a certificate from the approved CSR at a step 930;

Sign the certificate with the CA private key at a step 932;

At step 934, move the signed certificate from the "to be reviewed" queue to a "to be retrieved" memory queue accessible to the IRP server 905.

Similar to the automated RA/CA process, the client device 903 retrieves the signed certificate from the IRP server 905. The client device 803 also does retrieval of the signed certificate via an IRP Get_Certificate message 936 at a regular interval (e.g. every 30 seconds). After receiving the IRP Get_Certificate message 936, the IRP server 905 retrieves the signed certificate from the "to be retrieved" queue at a step 938. The IRP server 905 returns the signed certificate back with an IRP Get_Certificate status message 940, and the client device 903 does a link of the signed certificate with the corresponding private key in a certificate storage accessible to the user's client device 803 at a step 942. At a step 944, completion of retrieval of the signed certificate is notified to the user 901 through a user interface on the user's client device 903.

Renew Certificate—Key Rollover (IRP-based PKI)

The RA and CA process for certificate renewal is similar to the RA and CA process for new certificate enrollment.

Figure 10:
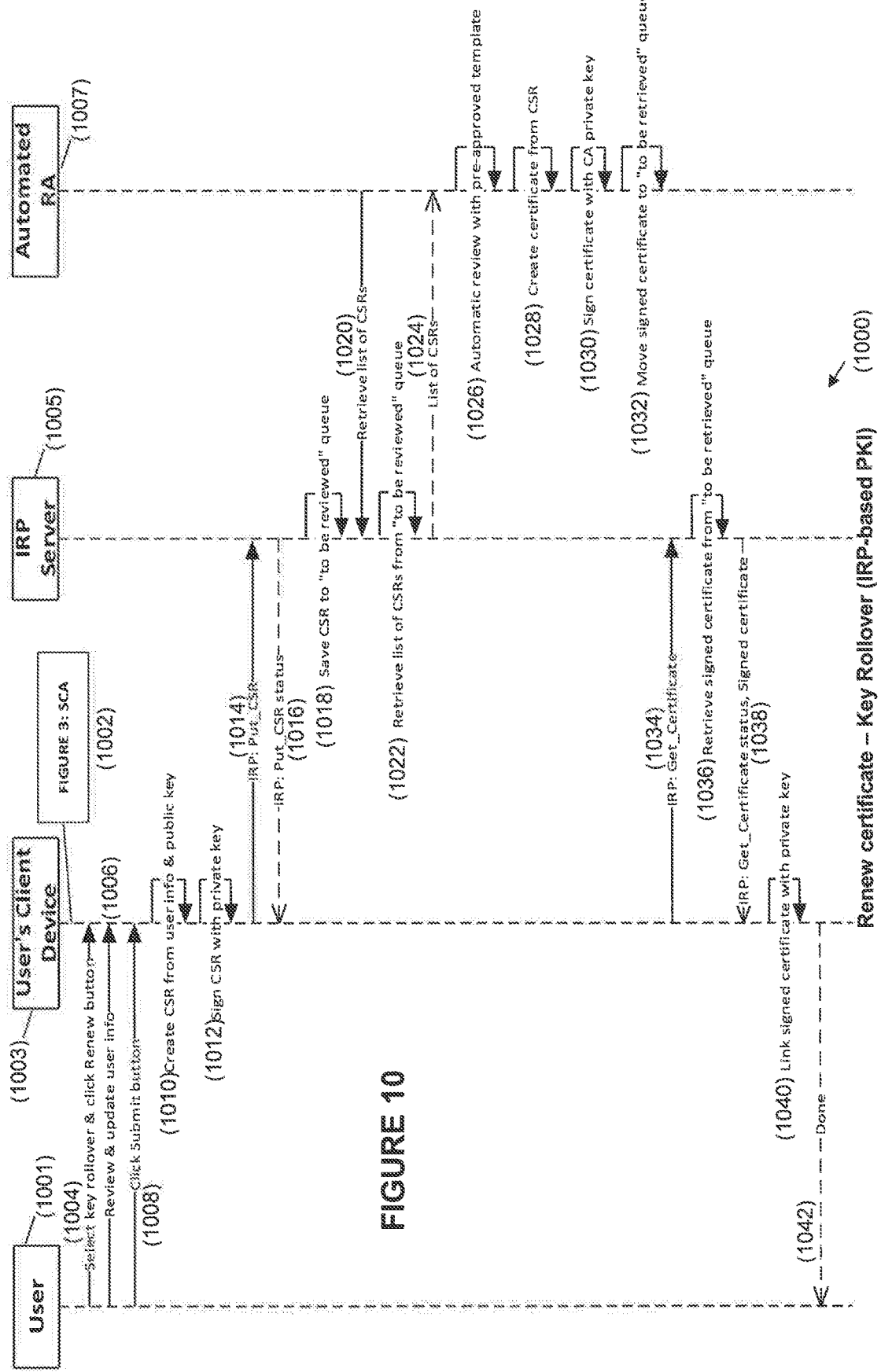
FIG. 10 is a flow diagram illustrating infrastructure for key rollover procedure during renewal of a digital certificate according to an example of the present disclosure.

FIG. 10 shows a flow diagram 1000 of interactions between a user's client device 1003 and an IRP server 1005 for an automated RA process 1007. A user 1001 (with a certificate previously issued by the IRP server 1005 to the user's client device 1003 according to the flow diagrams 800 or 900) launches an IRP client application on the device 1003. The user account had been created and the password was made known to the user 1001. After SCA (i.e. standard TLS with mutual authentication i.e. server and client authentication involving digital certificate), the user 1001 initiates a transaction for renewal of a digital certificate with key rollover, which means the original key remains unchanged.

After the user 1001 is authenticated using SCA illustrated by the flow diagram 300 in FIG. 3 at a step 1002, she selects key rollover and clicks a Renew button in a user interface of the user's client device 1003 to request for renewal of her expired or soon expired certificate at a step 1004. The user 1001 then reviews and updates her user information in the user interface of the user's client device 1003 at a step 1006. Following that, the user 1001 clicks a Submit button in the user interface of the user's client device 1003 at a step 1008. The client device 1003 then does the following:

Create a CSR from the user information entered and an existing public key of the expired or soon expired certificate at a step 1010;

Sign the CSR using an existing private key of the expired or soon expired certificate at a step 1012;

Submit the self-signed CSR to the IRP server 1005 via an IRP Put_CSR message 1014 for processing.

After indicating receipt of the IRP Put_CSR message 1014 to the user's client device 1003 via an IRP Put_CSR status message 1016, the IRP server 1005 saves the received CSR to a "to be reviewed" memory queue accessible to the IRP server 1005 for further processing at a step 1018. The automated RA process 1007 is a scheduled task that runs at a regular interval (e.g. every 30 seconds) to poll the "to be reviewed" queue accessible to the IRP server 1005 at a step 1020 to retrieve a list of CSRs from the "to be reviewed" queue. After each poll, the IRP server 1005 retrieves the list of CSRs from the "to be reviewed" queue at a step 1022. The list of CSRs from the "to be reviewed" queue is then passed to the automated RA process 1007 for processing at a step 1024. For each CSR retrieved from the IRP server 1005, the automated RA process 1007 does an automatic review based on a pre-approved authentication template at a step 1026. Upon approval of a CSR, the automated RA process 1007 does the following:

Create a certificate from the approved CSR at a step 1028;
Sign the certificate with a CA private key at a step 1030;
Move the signed certificate from the "to be reviewed" queue to a "to be retrieved" memory queue accessible to the IRP server 1005 at a step 1032.

The signed certificate is the renewed certificate.

The client device 1003 also does retrieval of the signed certificate via an IRP Get_Certificate message 1034 at a regular interval (e.g. every 30 seconds). After receiving the IRP Get_Certificate message 1034, the IRP server 1005 retrieves the signed certificate from the "to be retrieved" queue at a step 1036. The IRP server 1005 returns the signed certificate back with an IRP Get_Certificate status message 1038, and the client device 1003 does a link of the signed certificate with the corresponding private key in a certificate storage accessible to the user's client device 1003 at a step 1040. At a step 1042, completion of retrieval of the signed certificate is notified to the user 1001 through a user interface on the user's client device 1003.

Renew Certificate—Key Replacement (IRP-based PKI)

FIG. 11 shows a flow diagram 1100 of interactions between a user's client device 1103 and an IRP server 1105 for an automated RA process 1107. A user 1101 (with a certificate previously issued by the IRP server 1105 to the user's client device 1103) launches an IRP client application on the device 1103. The user account had been created and the password was made known to the user 1101. After SCA (i.e. standard TLS with mutual authentication i.e. server and client authentication involving digital certificate), the user 1101 initiates a transaction for renewal of a digital certificate with key replacement, which means the original key is replaced.

After the user 1101 is authenticated using SCA illustrated by the flow diagram 300 in FIG. 3 at a step 1102, she selects key rollover and clicks a Renew button in a user interface of the user's client device 1103 to request for renewal of her expired or soon expired certificate at a step 1104. The user 1101 then reviews and updates her user information in the user interface of the user's client device 1103 and following that, the user 1001 clicks a Submit button in the user interface of the user's client device 1003 at a step 1106. In this example, the user's client device 1103 and the IRP server 1105 are set up for key replacement instead of key rollover like in the case of the flow diagram of FIG. 10. It could be in other examples that the key replacement and key rollover are provided as selectable options to the user 1101. The client device 1103 in this case does the following after the user 1101 clicks the Submit button:

Generate a public and private key pair for the expired or soon expired certificate at a step 1108;
Create a CSR from the user information entered and the generated public key at a step 1110;
Sign the CSR using the generated private key at a step 1112;
Submit the self-signed CSR to the IRP server 1105 via an IRP Put_CSR message 1114 for processing.

After indicating receipt of the IRP Put_CSR message 1114 to the user's client device 1103 via an IRP Put_CSR status message 1116, the IRP server 1105 saves the received CSR to a "to be reviewed" memory queue accessible to the IRP server 1105 for further processing at a step 1118. The automated RA process 1007 is a scheduled task that runs at a regular interval (e.g. every 30 seconds) to poll the "to be reviewed" queue accessible to the IRP server 1105 at a step 1120 to retrieve a list of CSRs from the "to be reviewed" queue. After each poll, the IRP server 1105 retrieves the list of CSRs from the "to be reviewed" queue at a step 1122. The list of CSRs from the "to be reviewed" queue is then passed to the automated RA process 1107 for processing at a step 1124. For each CSR retrieved from the IRP server 1105, the automated RA process 1107 does an automatic review based on a pre-approved authentication template at a step 1126. Upon approval of a CSR, the automated RA process 1107 does the following:

Create a certificate from the approved CSR at a step 1128;
Sign the certificate with a CA private key at a step 1130;
Move the signed certificate from the "to be reviewed" queue to a "to be retrieved" memory queue accessible to the IRP server 1005 at a step 1132.

The signed certificate is the renewed certificate.

The client device 1103 also does retrieval of the signed certificate via an IRP Get_Certificate message 1134 at a regular interval (e.g. every 30 seconds). After receiving the IRP Get_Certificate message 1134, the IRP server 1105 retrieves the signed certificate from the "to be retrieved" queue at a step 1136. The IRP server 1105 returns the signed certificate back with an IRP Get_Certificate status message 1138, and the client device 1103 does a link of the signed certificate with the corresponding private key in a certificate storage accessible to the user's client device 1103 at a step 1140. At a step 1142, completion of retrieval of the signed certificate is notified to the user 1101 through a user interface on the user's client device 1103.

Revoke Certificate (IRP-based PKI)

Figure 12:
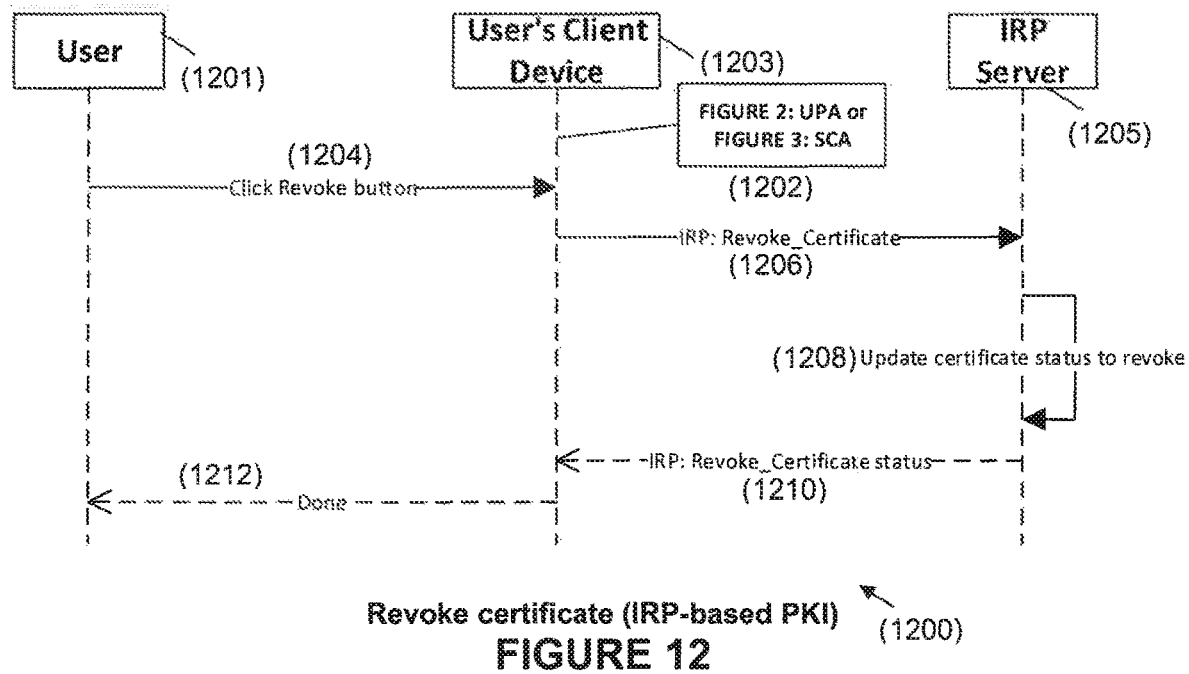
FIG. 12 is a flow diagram illustrating infrastructure for revocation of a digital certificate according to an example of the present disclosure.

FIG. 12 shows a flow diagram 1200 of interactions between a user's client device 1203 and an IRP server 1205. A user 1201 (with or without certificate issued by the IRP server 1205 for the user's client device 1203) launches an IRP client application on the device 1203. The user account had been created and the password was made known to the user 1201.

In the present example, if the user's client device 1203 does not have a certificate with the IRP server 1205, the user 1201 is authenticated using UPA illustrated by the flow diagram 200 in FIG. 2 at a step 1202. After UPA (i.e. standard TLS with server authentication and password authentication), the user 1201 initiates a transaction to revoke a selected digital certificate.

In the present example, if the user's client device 1203 has a certificate with the IRP server 1205, the user 1201 is authenticated using SCA illustrated by the flow diagram 300 in FIG. 3 at a step 1202. After SCA (i.e. standard TLS with mutual authentication i.e. server and client authentication involving digital certificate), the user 1201 initiates a transaction to revoke a selected digital certificate.

To initiate the transaction to revoke the selected digital certificate, the user 1202 selects a digital certificate and clicks a Revoke button in a user interface of the user's client device 1203 to request for revocation of the selected certificate at a step 1204.

After the user 1201 clicks the Revoke button, the user's client device 1203 sends a Revoke_Certificate message 1206 to the IRP server 1205. The IRP server 1205 then updates the certificate status of the selected certificate previously saved in a database or data storage accessible to the IRP server 1205 to revoked status. Thereafter, the IRP server 1210 sends a Revoke_Certificate status message 1210 to the user's client device 1203 to inform the user's client device 1203 that the selected certificate has been revoked. At a step 1212, completion of revocation of the selected certificate is notified to the user 1201 through a user interface on the user's client device 1203.

Backup Key (IRP-based PKI)

Figure 13:
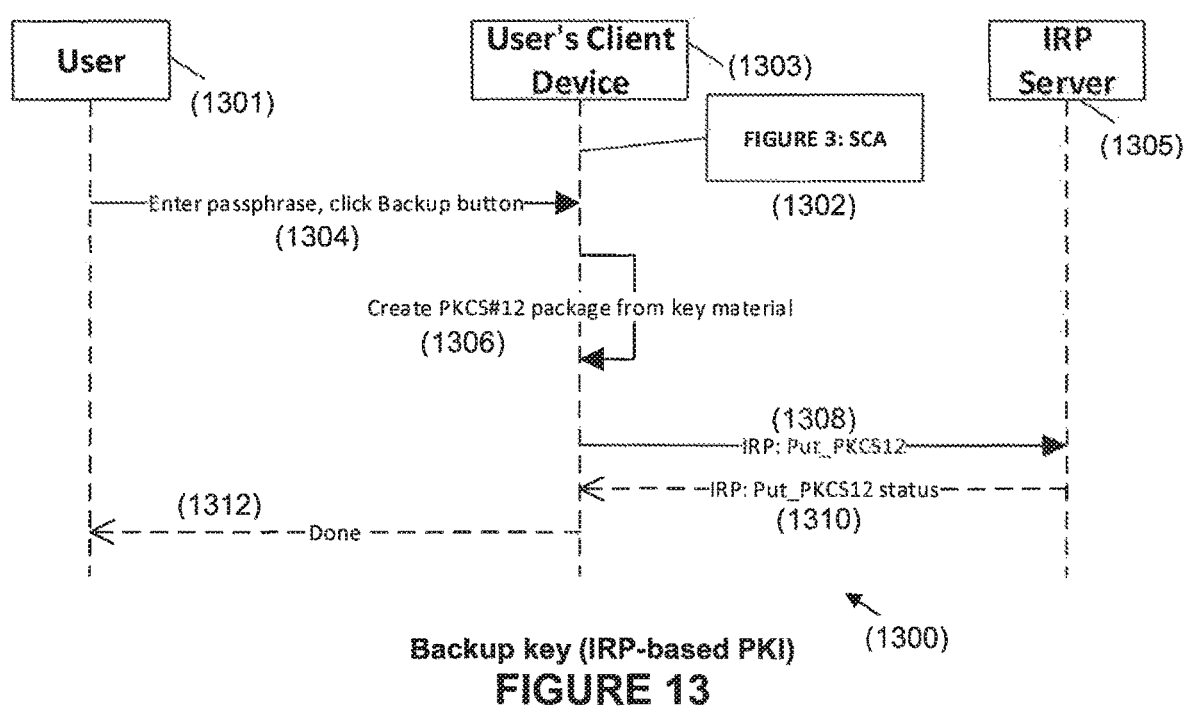
FIG. 13 is a flow diagram illustrating infrastructure for creating a backup key according to an example of the present disclosure.

FIG. 13 shows a flow diagram 1300 of interactions between a user's client device 1303 and an IRP server 1305. A user 1301 (with a certificate issued by the IRP server 1305 for the user's client device 1303) launches an IRP client application on the device 1303. The user account had been created and the password was made known to the user 1301.

In the present example, as the user's client device 1303 has a certificate with the IRP server 1305, the user 1301 is authenticated using SCA illustrated by the flow diagram 300 in FIG. 3 at a step 1302. After SCA (i.e. standard TLS with mutual authentication i.e. server and client authentication involving digital certificate), the user 1301 initiates a transaction to back up a key of a digital certificate. This key back up process defined by the flow diagram 1300 can be set such that it normally happens automatically when the user 1301 retrieves her existing or new certificate from the IRP server 1305.

The user 1301 first enters a user passphrase for the creation of a PKCS#12 package and clicks a Backup button in a user interface of the user's client device 1303 to request for backing up of a key of a selected existing or new certificate at a step 1304. The user's client device 1303 then creates the PKCS#12 package from key material. Thereafter, the user's client device 1303 sends the created PKCS#12 package to the IRP server 1305 via a Put_PKCS12 message 1308. The IRP server 1305 replies to indicate that the received PKCS#12 package is saved and thus backed up via a Put_PKCS12 status message 1310. At a step 1312, completion of backing up of the key is notified to the user 1301 through a user interface on the user's client device 1303.

Recover Key (IRP-based PKI)

Figure 14:
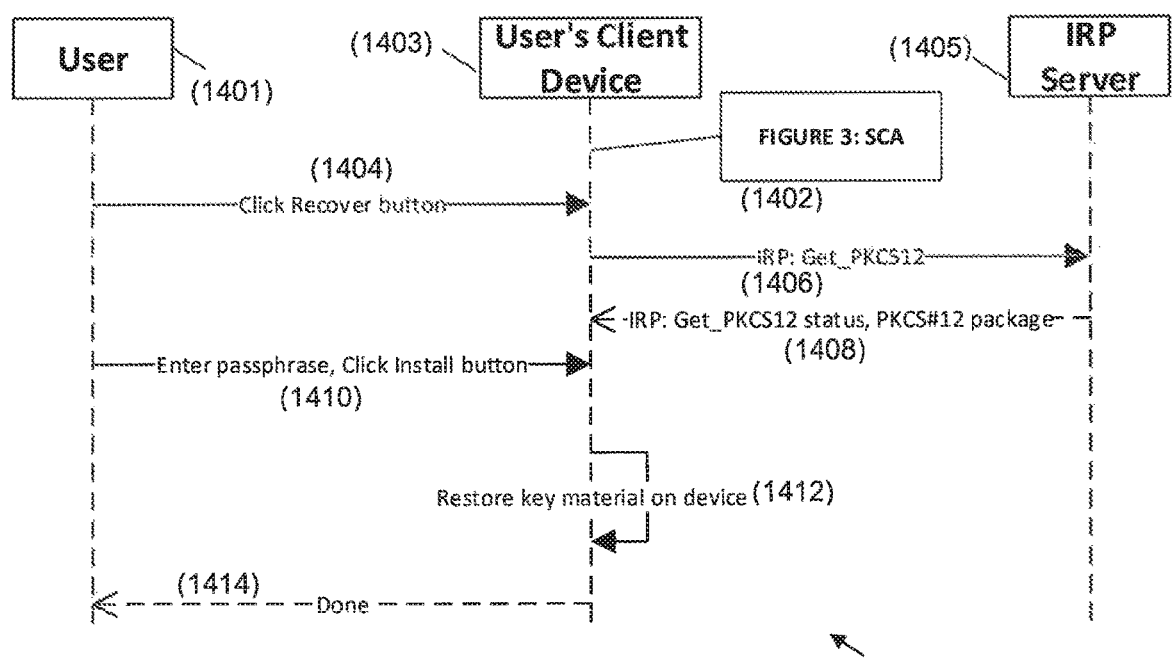
FIG. 14 is a flow diagram illustrating infrastructure for recovering a key according to an example of the present disclosure.

FIG. 14 shows a flow diagram 1400 of interactions between a user's client device 1403 and an IRP server 1405. A user 1401 (with a certificate issued by the IRP server 1405 for the user's client device 1403) launches an IRP client application on the device 1403. The user account had been created and the password was made known to the user 1401.

In the present example, as the user's client device 1403 has a certificate with the IRP server 1405, the user 1401 is authenticated using SCA illustrated by the flow diagram 300 in FIG. 3 at a step 1402. After SCA (i.e. standard TLS with mutual authentication i.e. server and client authentication involving digital certificate), the user 1401 initiates a transaction to recover a key of a digital certificate. This recover key process defined by the flow diagram 1400 facilitates recovery of a key lost or corrupted under certain circumstances.

The user 1401 clicks a Recover button in a user interface of the user's client device 1403 to request for recovery of a key of a selected existing certificate at a step 1404. The user's client device 1403 then sends a Get_PKCS12 message 1406 to the IRP server 1405 to get a previously stored or backed up PKCS#12 package for the lost or corrupted key. Thereafter, the IRP server 1405 retrieves the requested PKCS#12 package from a memory accessible by it and sends the PKCS#12 package over to the user's client device 1403 along with a Get_PKCS12 status message 1408.

Upon receiving the PKCS#12 package, the user 1401 is prompted to enter a passphrase used for creating the PKCS#12 package and click on an Install button at a step 1410. Thereafter, the key material is restored on the user's client device 1403 at a step 1412. At a step 1414, completion of recovery of the key is notified to the user 1401 through a user interface on the user's client device 1403.

Comparison on Certificate Lifecycle Operations (Web & IRP-based PKI Approach)

Table 2 shows a comparison made between traditional web-based and IRP-based approaches on different certificate lifecycle operations.

| Web-based PKI Approach | IRP-based PKI Approach |
|---|---|
| Certificate Enrollment (i.e. Request new certificate) | |
| Choice of algorithms (for key pair generation) available to the user is limited by the browser implementation (especially if the browser's source code is not available. For example, Microsoft Internet Explorer). Newer and stronger algorithms are not readily available. The implementation of current algorithms is not transparent. | Choice of algorithms (for key pair generation) is available to the user as the browser's source code is controlled by the application developer. Newer and stronger algorithms are easily supported. The implementation of current algorithm is controllable. |
| Manual processes are involved from the user, the RA administrator to the PKI administrator. The user waits for a time period before getting her certificate signed and returned to her. | The certificate provisioning is almost fully automated from a user's single click to request for a certificate (See FIG. 8), with the exception that only the RA/CA process can be a manual process (See FIG. 9). |
| The built-in mechanism of MS Internet Explorer and Google Chrome web browsers uses a IX509CertificateRequestPkcs10 interface from MS Certificate Enrollment SDK (Software Development Kit) to create a CSR for submission to a CA web server. The private key and signed certificate are stored in a Microsoft Certificate Storage. The built-in mechanism of Firefox, Opera and most implementation of HTML5 web browsers uses a "<keygen>" tag in an HTML form context together with other information to create a CSR for submission to the CA web server. The private key and signed certificate are stored in a Mozilla Certificate Storage. | Certificate enrollment is comprehensively defined in semantic within the XML structure of the IRP. This allows compatibility between the IRP client and server applications, and reduces interoperability issues arising from interpreting message contents. |

-continued

Figure 11A:
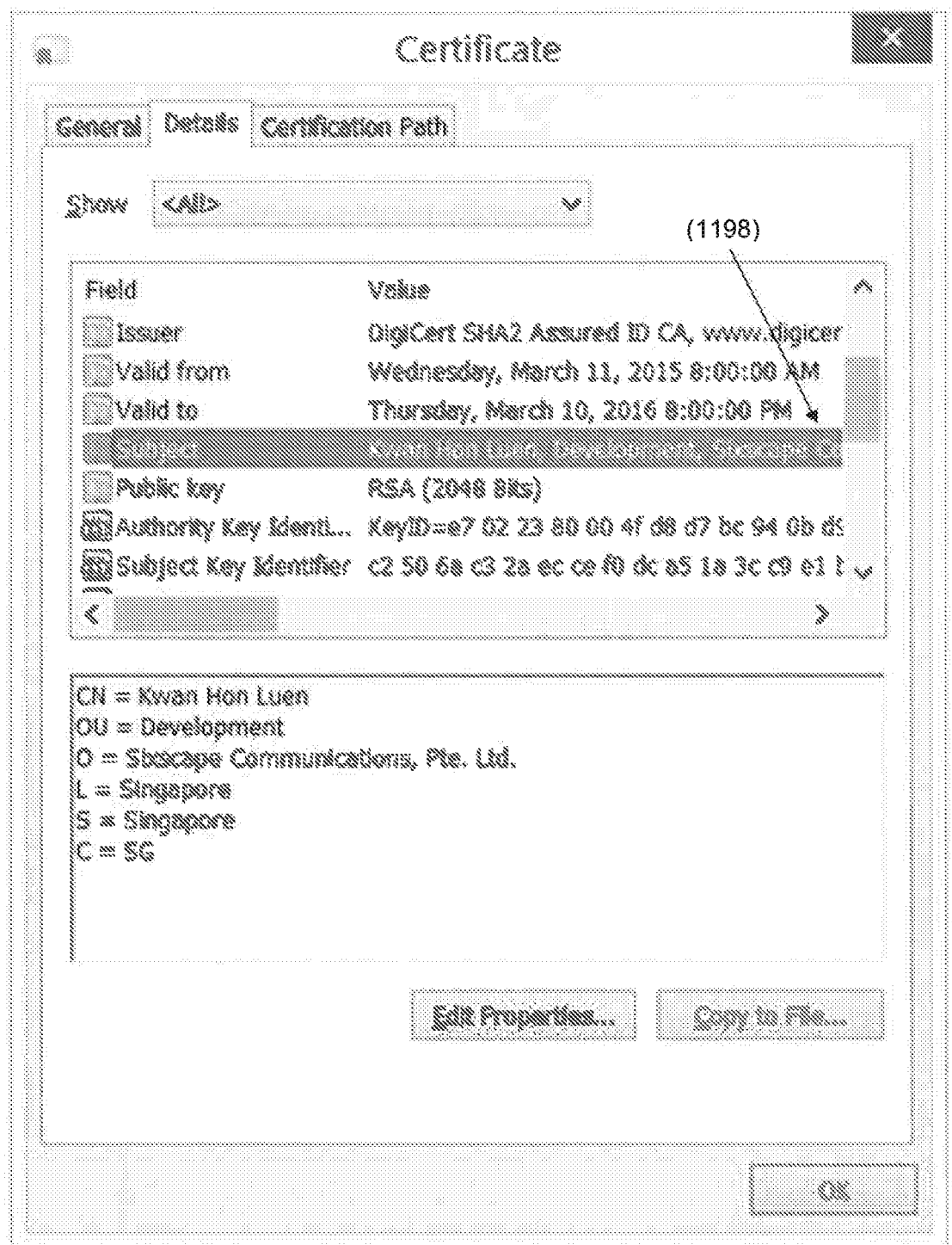
FIG. 11A shows a Microsoft Windows dialogue box highlighting a Subject Distinguished Name field.

| Web-based PKI Approach | IRP-based PKI Approach |
|---|---|
| Both built-in certificate enrollment schemes i.e. the aforementioned built-in mechanisms are not compatible with each other. | |
| Certificate Renewal with Key Rollover (i.e. Reuse current public key) | |
| Uploading of a current certificate to a CA web server (to extract user information and public key value for the purpose of certificate renewal) is not possible, as Microsoft/Mozilla built-in mechanism requires a new key pair to be generated to submit a CSR. It is only possible if the CA web server stores a copy of the current certificate (with the user information and public key value). | Makes use of local processing to create a new CSR from a current certificate and submit to an IRP server. Does not require archiving of CSR or certificate on the IRP server. User information for the new certificate is reviewed and updated as necessary. (See FIG. 10) |
| Certificate Renewal with Key Replacement (i.e. Generate new key pair) | |
| Equivalent to a web-based new certificate enrollment. | Equivalent to an IRP-based new certificate enrollment, except that all SubjectDN (Subject Distinguished Name) information can be retrieved from an existing cert. (See FIGS. 11 and 11A) FIG. 11A shows a windows dialogue box 1199 highlighting a SubjectDN field 1198. |
| Key Backup & Recovery | |
| No built-in mechanism (with proper user authentication) to create a PKCS#12 package from a local certificate storage or to upload to a CA web server. If a link to the PKGS #12 package is provided on a web page, double clicking on that downloads & installs the certificate on the browser's certificate storage. Knowledge of the passphrase used to create the PKCS #12 file is required. | Make uses of local processing to create a PKCS#12 package and submit to an IRP server (using SCA authentication), and to retrieve a PKCS #12 package to either restore lost key material or to load it onto a new device. Knowledge of the passphrase used to create the PKCS #12 file is required. (See FIG. 12) |
| Certificate Revocation | |
| User provides revocation passphrase to revoke certificate "out of band". It is easy for the users to forget their revocation passphrase once they have gotten their signed certificate. | User does an UPA/SCA logon and then can revoke her own certificate. (See FIG. 13) |

Comparison of Current Certificate Management (PKI) Protocols

CMS (Cryptographic Message Syntax) is specified in RFC 5652. It is used to digitally sign, digest, authenticate, or encrypt arbitrary message content. It is an S/MIME email message format.

CRMF (Certificate Request Message Format) is specified in RFC 4211. It is used to convey a request for a certificate to a CA via a RA for the purposes of creating certificate. The request typically includes a public key and associated registration information. It does not define a certificate request protocol.

CMP (Certificate Management Protocol) is specified in RFC 4210. Protocol messages are defined for certificate creation and management. CMP provides online interactions between PKI components, including an exchange between a CA and a client. It uses CRMF and is a client/server request & response protocol.

CMC (Certificate Management over CMS) is specified in RFC 5272. It defines the base syntax for CMC protocol using the CMS. It uses CRMF and CMS (in S/MIME email message format).

SCEP (Simple Certificate Enrollment Protocol) is a client/server protocol to allow routers to request & retrieve IPsec certificates.

All the above mentioned existing certificate management (PKI) protocols do not have an integrated user directory with authentication. There is no mechanism to allow look up of a user, with or without authentication, which is possible with an IRP enabled server. These protocols are not comprehensive in the coverage of certificate management services. Not every function of a PKI are specified for implementation. There is no concept of a location-based identity (i.e. IP address) or attribute-based identity (i.e. client certificate).

In contrast, IRP is a certificate management (or PKI) protocol that combines three essential features:
 1. A distributed user identity directory;
 2. A comprehensive distributed certificate management protocol;
 3. A real-time IPv6 address location registry.

Strong authentication security (i.e. UPA, SCA, UPA fallback) is designed into the protocol from the start. At a central IRP server, an administrator creates a user account to start the (identity management) process. This is similar to creating a user email account before the user can start sending emails. After the user account creation, the user credentials (i.e. user identifier (ID) and password) are sent to the user via an "out of band" secure channel.

With the user credentials, the user (with her IRP client application on her client device) uses UPA to logon to the IRP server for the first time to request for an initial certificate. Once the certificate is obtained, she uses SCA to logon to the IRP server subsequently to do other PKI transactions. SCA is stronger than UPA. The user's UPA account is disabled after her initial signed certificate is created. Her UPA account is used only at the beginning to bootstrap the certificate request process until she has obtained a valid certificate.

It is possible to eliminate the use of UPA entirely. At the central, the administrator directly creates the user's certificate after creating her user account (without UPA credential). After the user account creation, the user credentials (i.e. a passphrase protected private key & a signed certificate) are sent to the user via an "out of band" secure channel.

In general, the user's UPA account is used in situations where she does not have a valid certificate to authenticate herself to the IRP server. They are:

Initial request for new certificate (mentioned above);
Request for certificate replacement when the user has lost her client device (storing her certificate);
Request for certificate renewal when the user's certificate is expiring or has expired;
Request for certificate replacement when the user's client device (storing her certificate) has been stolen;
Request for certificate restoration when the user's accidentally deletes her certificate on her client device.

The use of UPA account in these situations is termed as an UPA fallback. The user logons to her temporarily activated UPA account (done by an administrator of the IRP server) to request for her certificate. Where the administrator centrally creates the user's certificate, she has to inform the administrator to replace her certificate in these situations.

The UPA method is inherently insecure. The following measures may be used to prevent attacks on a password database:

A user account is always deactivated after the user has obtained a valid certificate;
An activated user account has a very short activation period (e.g. 30 minutes);
A user password is not stored in clear text. It is hashed strongly using PBKDF2 (specified in RFC 2898 & PKCS#5 v2.0) and then encrypted with a symmetric key stored in a HSM (Hardware Security Module). The password of an activated user account is in PBKDF2 hashed format. It is in AES encrypted PBKDF2 hashed format when the user account is deactivated.
At the beginning, the administrator centrally creates a user account for a user with a user's client device installed with a client application that can work with an IRP server. This account may include the following information:
Traditional user data (e.g. name, email address, home address, mobile contact number, date of birth, etc.);
Client digital certificate;
IP address (of the user's client device used to logon to IRP server).

The administrator fills in the traditional user data for the user. The user can update her data when she logon via the client application in the future. The client digital certificate and IP address fields are empty or blank when the user account is created. They are updated with details when the user (with her client device) logon to the IRP server via a user interface of the client application installed in the user's client device, and when the user has obtained her certificate from the IRP server to her client device.

A user identity directory containing the aforementioned user information is a first essential feature of the IRP. The public information in the user's account is published as part of an IRP message. A user is able to look up another user by using IRP messages, for example, Get_User_List and Get_User. The inclusion of digital certificate and IP address as part of a user's identity enables other users to, for instance, do the following transactions:

Establish a connection for secure communications (using IP address of a peer user's client device);
Encrypt a message using a recipient user's public certificate (with her public key);
Authenticate a peer user in a connection for secure communications.

The user identity directory feature can be distributed in nature. For example, a user on one network (i.e. in one domain) is able to look up another user on another network (i.e. in another domain) to do the above mentioned transactions. This distributed feature is further discussed in a later section.

The PKI or certificate management protocol is a second essential feature of the IRP. The comprehensive IRP messages provided by IRP cover the following PKI functions:

Certificate enrollment (i.e. Put_CSR, Get_Certificate);
Certificate renewal (i.e. Put_CSR, Get_Certificate);
Certificate revocation (i.e. Revoke_Certificate);
Certificate validation (i.e. Check_Certificate involves checking validity, trust chain, and revocation status);
Key backup (i.e. Put_PKCS12);
Key recovery (i.e. Get_PKCS12);
Certificate retrieval (i.e. Get_Certificate, Get_CA_Certificates);
Etc.

The PKI protocol feature can be distributed in nature. For example, a user on one network is able to retrieve CA certificates or validate a user certificate of another network. This distributed feature is further discussed in a later section.

The IP address location registry feature is a third essential feature of the IRP. It is mentioned above that the user's identity consists of IP address of the user's client device used to logon to an IRP server. Adding on to this is the ability of a client device to automatically update its new or current IP address to the IRP server, should the client device were to move from one wireless network to another. This update is real-time at the point of IP address change. This insures that the user remains contactable by other users (in other networks) at all times, irregardless of her movement across different networks. This overcomes long time period (i.e. 12 to 24 hours) taken by the traditional DNS (Domain Name System) approach to propagate new IP addresses (of the servers). DNS was designed based on static servers' IP addresses in IPv4 networks. IRP is designed based on volatile client devices' IP addresses in IPv6 networks.

Distributed Features of IRP

IRP is designed to work on distributed networks. The user identity directory and certificate management services provided by IRP are distributed and implemented as IRP domains. On each domain, an authoritative IRP server manages the user accounts and their issued client certificates. This form of de-centralization solves the problem of having a large centralized CA to issue client certificates for every user. The following example visualizes the nature of the problem to issue client certificates on large scale.

For example, a commercial bank branch uses a single Internet Banking (IB) server to provide consumer IB service to approximately 2,000 users locally. A single CA is used to issue all the certificates. It is trivial to issue a single server certificate to the single local IB server for server authentication. It is within the capacity of the CA to issue 2,000 client certificates to the 2,000 users for client authentication. If on a worldwide scale, there are a total of 500 IB servers for the consumers, and the same CA is used to issue all the certificates. It is still within the capacity of the single CA to issue 500 server certificates. It is, however, a gigantic operation to issue a total of 1,000,000 client certificates to all the users. This poses a problem for managing the lifecycle of client certificates for these users. The CA faces a problem to scale if the user base should increase further in the future. All of this is solved by using a distributed CA across the users worldwide.

The comprehensively defined IRP messages as discussed earlier allows distributed PKI operations to flow across every IRP server (CA) across the networks (i.e. IRP domains). When a user goes to a local bank branch to open a bank account, the bank operator (or administrator) centrally creates a user account on the (local domain) IRP server, and provides her with her UFA password. The user does an UPA logon to the (local domain) IRP server to apply for her new certificate, which she subsequently uses to do SCA logon for her other PKI transactions. If she intends to do a transaction with another bank user's on another country (served by an IRP server on another domain), she retrieves that user's identity (with current IP address), does a certificate validation, and make a secure connection to that user to do the transaction. These are all done via sending IRP messages to her (local domain) IRP server, which then relays her request to the IRP server of the other user's domain. This is somewhat equivalent to a DNS recursive retrieval.

Validate Certificate—Distributed Domain (IRP-based PKI)

Figure 15:
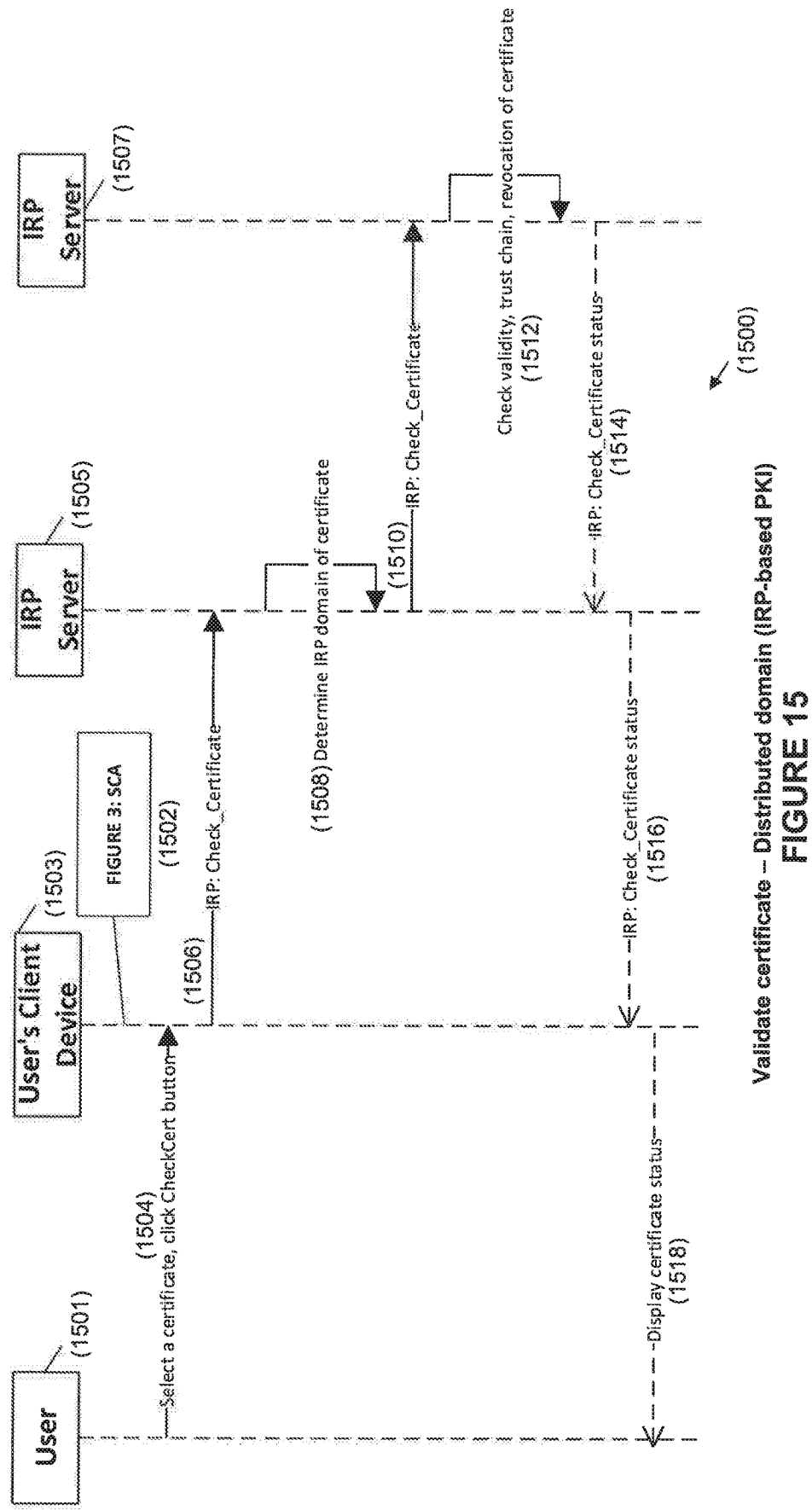
FIG. 15 is a flow diagram illustrating infrastructure for validating a digital certificate according to an example of the present disclosure.

FIG. 15 shows a flow diagram 1500 of interactions between a user's client device 1503, a first IRP server 1505 and a second IRP server 1507 to illustrate validation of a digital certificate in a distributed domain environment. A user 1501 (with a certificate previously issued by the IRP server 1507 to the user's client device 1503 according to the flow diagrams 800 or 900) launches an IRP client application on the device 1503. The user account had been created at the IRP server 1507 and the password was made known to the user 1501. After SCA (i.e. standard TLS with mutual authentication i.e. server and client authentication involving digital certificate), the user 1501 initiates a transaction for validation of a digital certificate.

In this example, the IRP server servicing the domain of the client device 1503 of the user 1501 is IRP server 1505. The user's client device 1503 first retrieves the hostname (address) of the user's IRP server 1505 from the client device's 1503 configured Domain Name System server using a Service Record (SRV record) lookup for IRP service. This hostname retrieval features may also be applicable to the client devices 203, 303, 803, 903, 1003, 1103, 1203, 1303, and 1403, and the corresponding respective IRP servers 205, 305, 805, 905, 1005, 1105, 1205, 1305, and 1405 prior to their respective authentications via the method illustrated in the flow diagrams 200 or 300 of the FIG. 2 or 3.

Next, the client device 1503 uses the hostname of the returned IRP server 1505 to establish a TLS authentication (via SCA in this case) with the IRP server 1505. The user 1501 is authenticated with the IRP server 1505 through the client device 1503 using SCA illustrated by the flow diagram 300 in FIG. 3 at a step 1502, she selects a digital certificate to validate and clicks a CheckCert button for checking the certificate to be validated at a step 1504.

Upon clicking the CheckCert button, the user's client device 1503 sends a Check_Certificate message 1506 to the IRP server 1505.

After receiving the Check_Certificate message 1506, the IRP server 1505 determines the IRP domain of the certificate to be validated from the Check_Certificate message 1506 at a step 1508. During step 1508, the IRP server 1505 will read the Check_Certificate message from the client device 1503, which is trying to locate, in this case, a 'user2', which is the Certification Authority issuing the digital certificate to be validated. For example, a user ID of the user2 can be user2@anotherdomain.net. The IRP server 1505 determines the domain of user2 from the user ID, which can be, for example, anotherdomain.net. The IRP server 1505 then retrieves the user2's IRP server hostname, which leads to the IRP server 1507, from the IRP server 1505's configured DNS server (using a Service Record (SRV) record lookup for IRP service). The IRP server 1505 then uses the returned IRP server hostname to establish a TLS authentication with the IRP server 1507, thus linking up IRP server 1505 with the IRP server 1507 servicing the user2. After the IRP server 1505 is linked up with the IRP server 1507, the client device 1503 can communicate with the IRP server 1507 through the IRP server 1505.

Once the IRP domain of user2 is determined at the step 1508, the first IRP server 1505 sends a Check_Certificate message 1510 to the second IRP server 1507, which is servicing the IRP domain of user2. After receiving the Check_Certificate message 1510, the IRP server 1507 checks validity of the certificate for user2, its trust chain and whether the certificate has been recorded as revoked in memory accessible to the IRP server 1507 at a step 1512.

After checking, the IRP server 1507 sends a Check_Certificate status message 1514 indicating a status of the certificate to the IRP server 1505. The status could be valid or invalid. Upon receiving the Check_Certificate status message 1514, the IRP server 1505 sends a Check_Certificate status message 1516 containing similar contents to the user's client device 1503. At a step 1518, the user's client device 1503 then displays the certificate status in a user interface of the user's client device 1503 displayed on a display connected to the user's client device 1503.

Get User—Distributed Domain (IRP-based PKI)

Figure 16:
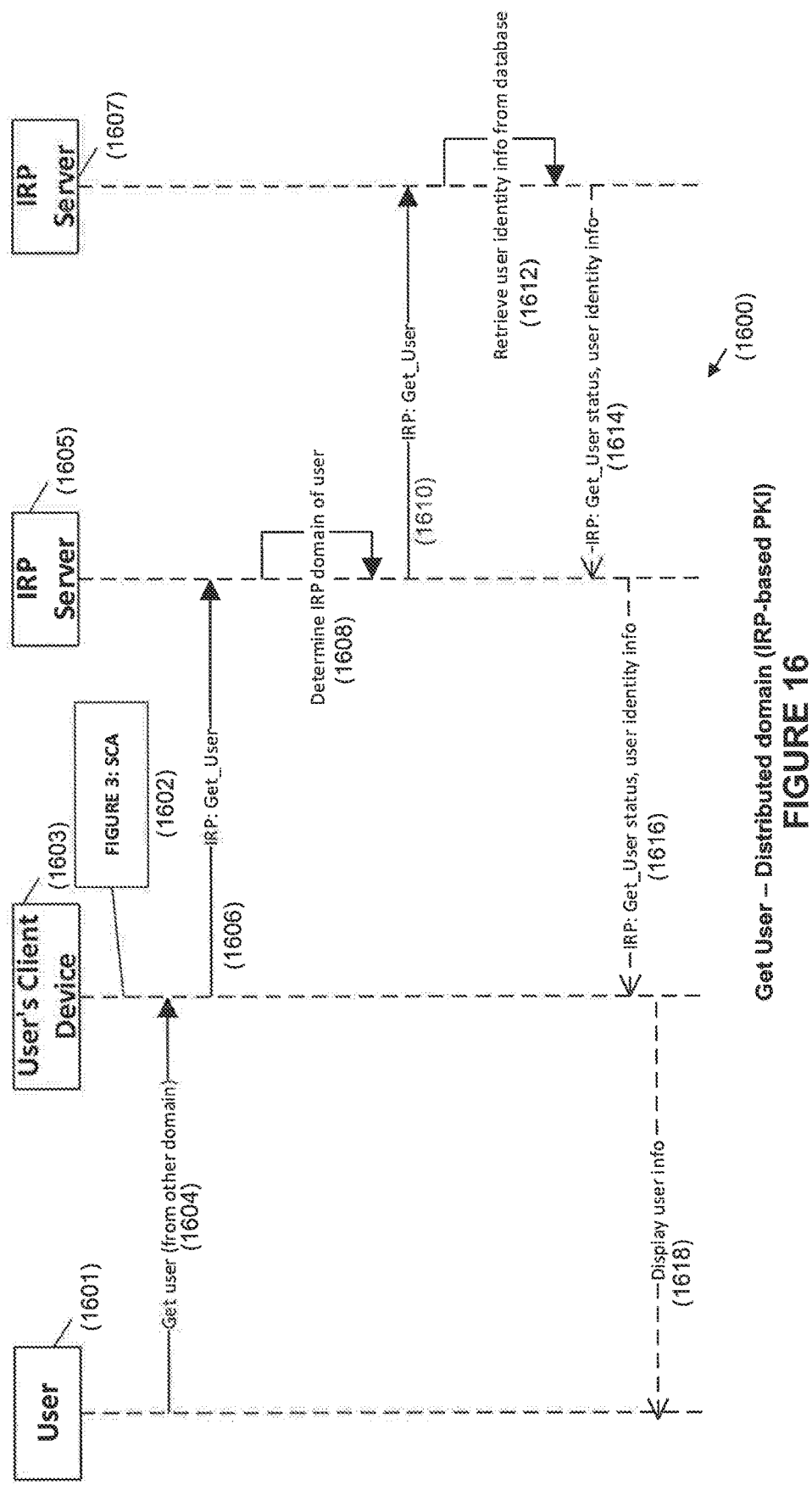
FIG. 16 is a flow diagram illustrating infrastructure for getting user details associated with a digital certificate according to an example of the present disclosure.

FIG. 16 shows a flow diagram 1600 of interactions between a user's client device 1603, a first IRP server 1605 and a second IRP server 1607 to illustrate a user having a user's client device 1603 serviced in one domain requesting for identity information of a user having a user's client device serviced in another domain. A user 1601 (with a certificate previously issued by the IRP server 1605 to the user's client device 1603 according to the flow diagrams 800 or 900) launches an IRP client application on the device 1603. The user account had been created at the IRP server 1605 and the password was made known to the user 1601. After SCA (i.e. standard TLS with mutual authentication i.e. server and client authentication involving digital certificate), the user 1601 initiates a transaction for validation of a digital certificate.

In this example, the IRP server servicing the domain of the client device 1603 of the user 1601 is IRP server 1505. The user's client device 1503 first retrieves the hostname (address) of the user's IRP server 1505 from the client device's 1503 configured Domain Name System server using a Service Record (SRV record) lookup for IRP service.

Next, the client device 1603 uses the hostname of the returned IRP server 1605 to establish a TLS authentication (via SCA in this case) with the IRP server 1605. The user 1601 is authenticated with the IRP server 1605 through the client device 1603 using SCA illustrated by the flow diagram 300 in FIG. 3 at a step 1602, she selects a Get_User command to the IRP server 1605 via the user's client device 1603 to get user identity information of another user (also called "queried user") having a user's client device serviced in another domain at a step 1604.

Upon selecting the Get_User command, the user's client device 1603 sends a Get_User message 1606 to the IRP server 1605.

After receiving the Get_User message 1606, the IRP server 1605 determines the IRP domain of the client device of the user queried by the user 1601 at a step 1608. During step 1608, the IRP server 1605 will read the Get_User message from the client device 1603, which is trying to locate, in this case, a 'user3', which is the Certification Authority having the queried user's records. For example, a user ID of the user3 can be user3@anotherdomain.net. The IRP server 1605 determines the domain of user3 from the user ID, which can be, for example, anotherdomain.net. The IRP server 1605 then retrieves the user3's IRP server hostname, which leads to the IRP server 1607, from the IRP server 1605's configured DNS server (using a Service Record (SRV) record lookup for IRP service). The IRP server 1605 then uses the returned IRP server hostname to establish a TLS authentication with the IRP server 1607, thus linking up the IRP server 1605 with the IRP server 1607 servicing the user3. After the IRP server 1505 is linked up with the IRP server 1607, the client device 1603 can communicate with the IRP server 1607 through the IRP server 1605. Once the IRP domain of user3 is determined, the first IRP server 1605 sends a Get_User message 1610 to the second IRP server 1607, which is servicing the IRP domain of user3. After receiving the Get_User message 1610, the IRP server 1607 retrieves user identity information of the queried user from a database or data storage accessible to the IRP server 1607 at a step 1612.

After retrieving, the IRP server 1607 sends a Get_User status message 1614 indicating a status of the queried user along with the retrieved user identity information to the IRP server 1605. The status may indicate successful retrieval if the user identity information could be retrieved or unsuccessful retrieval if the user identity information could not be retrieved. Upon receiving the Get_User status message 1614, the IRP server 1605 sends a Get_User status message 1616 containing similar contents to the user's client device 1603. At a step 1618, the user's client device 1603 then displays the identity information of the queried user in a user interface of the user's client device 1603 displayed on a display connected to the user's client device 1603.

System Architecture

The certificate storage or any storage mentioned in the present disclosure may be any machine- or computer-readable medium. The machine- or computer-readable medium may include storage devices such as magnetic or optical disks, memory chips, or other storage devices such as memory cards or sticks and the like suitable for interfacing with a general purpose computer or a mobile device such as a mobile smartphone, laptop, notebook, and the like.

The user's client devices 203, 303, 803, 903, 1003, 1103, 1203, 1303, 1403, 1503, and 1603 as described with reference to FIGS. 2, 3, 8, 9, 10, 11, 12, 13, 14, 15, and 16 respectively can be for instance, a desktop computer or a mobile device such as a mobile smartphone, laptop, notebook, and the like.

Figure 21:
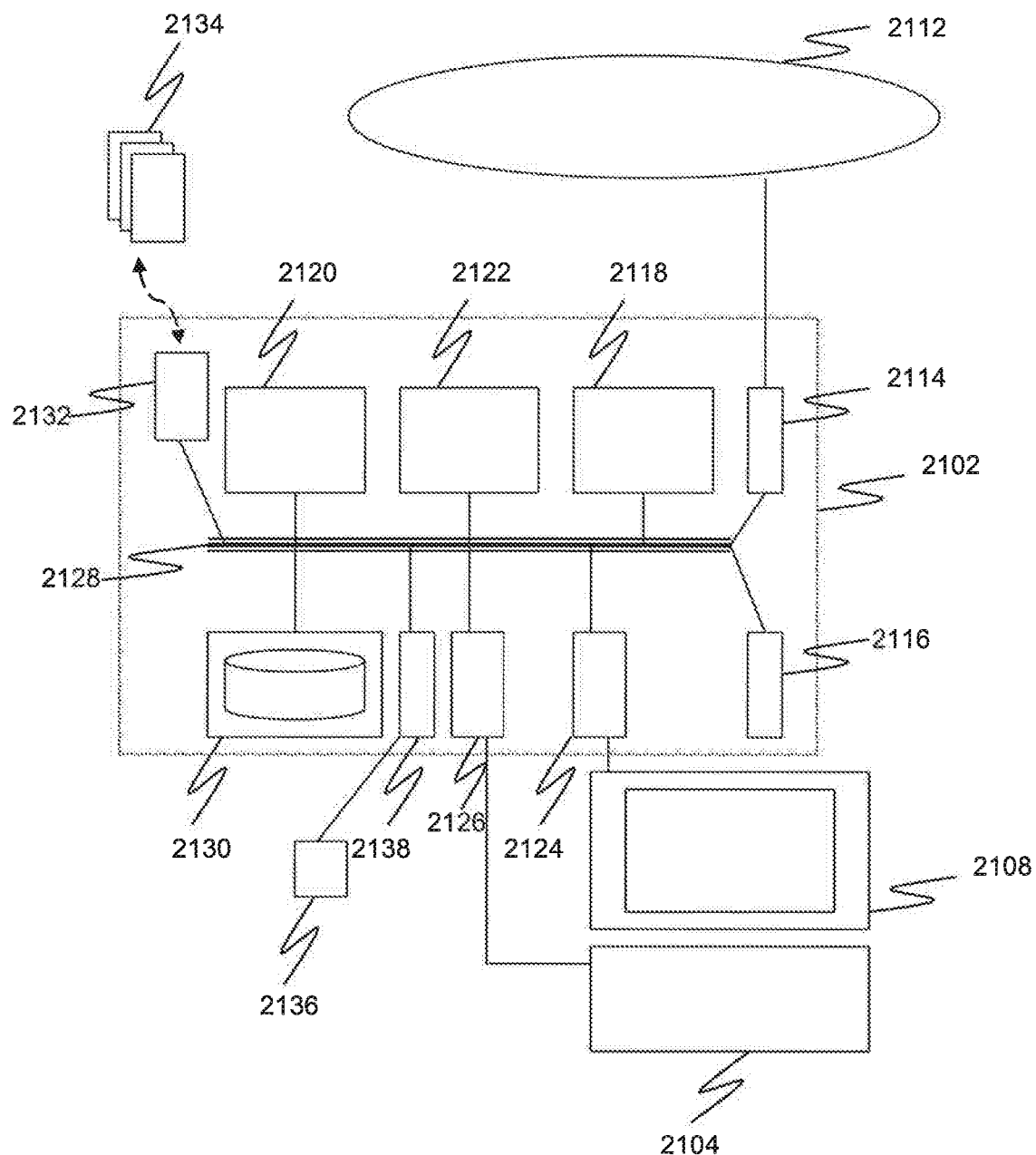
FIG. 21 is a system architecture of a processor of an Identity Registration Protocol (IRP) based server according to examples of the present disclosure.

FIG. 21 shows in more detail an example of a processor of the IRP server 205, 305, 805, 905, 1005, 1105, 1205, 1305, 1405, 1505, 1507, 1605 and 1607 described with reference to the FIGS. 2, 3, 8, 9, 10, 11, 12, 13, 14, 15, and 16. The processor (or more of it in the IRP server) may comprise a processing unit 2102 for processing software including one or more computer programs for running one or more computer/server applications to enable a backend logic flow or the method or methods for carrying out the steps as described with reference to the earlier Figures.

Furthermore, the processing unit 2102 may include user input modules such as a computer mouse 2136, keyboard/keypad 2104, and/or a plurality of output devices such as a display device 2108. The display of the display device 2108 may be a touch screen capable of receiving user input as well.

The processing unit 2102 may be connected to a computer network 2112 via a suitable transceiver device 2114 (i.e. a network interface), to enable access to e.g. the Internet or other network systems such as a wired Local Area Network (LAN) or Wide Area Network (WAN). The processing unit 2102 may also be connected to one or more external wireless communication enabled devices 2134 (For example, the user's client devices 203, 303, 803, 903, 1003, 1103, 1203, 1303, 1403, 1503, and 1603) via a suitable wireless transceiver device 2132 e.g. a WiFi transceiver, Bluetooth module, Mobile telecommunication transceiver suitable for Global System for Mobile Communication (GSM), 3G, 3.5G, 4G telecommunication systems, and the like. Through the computer network 2112, the processing unit 2102 can gain access to one or more storages i.e. data storages, databases, data servers and the like connectable to the computer network 2112 to retrieve and/or store data in the one or more storages.

The processing unit 2102 may include a processor 2118, a Random Access Memory (RAM) 2120 and a Read Only Memory (ROM) 2122. The processing unit 2102 may also include a number of Input/Output (I/O) interfaces, for example I/O interface 2138 to the computer mouse 2136, a memory card slot 2116, I/O interface 2124 to the display device 2108, and I/O interface 2126 to the keyboard/keypad 2104.

The components of the processing unit 2102 typically communicate via an interconnected bus 2128 and in a manner known to the person skilled in the relevant art.

The computer programs may be supplied to the user of the processing unit 2102, or the processor (not shown) of one of the one or more external wireless communication enabled devices 2134, encoded on a data storage medium such as a CD-ROM, on a flash memory carrier or a Hard Disk Drive, and are to be read using a corresponding data storage medium drive of a data storage device 2130.

Such computer or application programs may also be downloaded from the computer network 2112. The application programs are read and controlled in its execution by the processor 2118. Intermediate storage of program data may be accomplished using RAM 2120.

In more detail, one or more of the computer or application programs may be stored on any non-transitory machine- or computer-readable medium. The machine- or computer-readable medium may include storage devices such as magnetic or optical disks, memory chips, or other storage devices suitable for interfacing with a general purpose computer. The machine- or computer-readable medium may also include a hard-wired medium such as that exemplified in the Internet system, or wireless medium such as that exemplified in the Wireless LAN (WLAN) system and the like. The computer program when loaded and executed on such a general-purpose computer effectively results in an apparatus that implements the steps of the computing methods in examples herein described.

Key Features

Examples of the present disclosure can have the following features:

An apparatus (For example, 205, 305, 805, 905, 1005, 1105, 1205, 1305, 1405, 1505, 1507, 1605 and 1607 in the FIGS. 2, 3, 8, 9, 10, 11, 12, 13, 14, 15, and 16) for managing digital certificates, the apparatus comprising: one or more processor (For example, 2102 in FIG. 21) configured for executing program codes to control the apparatus for transmitting a response to a client device (For example, 203, 303, 803, 903, 1003, 1103, 1203, 1303, 1403, 1503, and 1603 in the FIGS. 2, 3, 8, 9, 10, 11, 12, 13, 14, 15, and 16) upon receiving a message to get capabilities of the apparatus from the client device, the client device being configured to communicate with the apparatus via a client application not using Hypertext Transfer Protocol, wherein the response indicates capabilities of the apparatus including whether the apparatus is able to establish a secure connection with the client device and whether the apparatus supports one or more authentication methods for authenticating the client device; authenticating the client device via the authentication method supported by the apparatus and selected based on user input to the client application; transmitting a digital certificate having a public key to the client device after the secure connection is established to enable authentication via verifying a private key corresponding to the public key if the selected authentication method authenticates via verifying the private key corresponding to the public key; and establishing the secure connection to communicate with the client device if the apparatus is able to establish the secure connection, wherein messages communicated via the secure connection between the apparatus and the client device are encrypted; and a database accessible by the apparatus to retrieve the digital certificate of the client device (For example, flow diagram 300 in FIG. 3).

Authentication of the client device may include verifying a username and a password transmitted to the apparatus against user information pre-stored in the database (For example, flow diagram 200 in FIG. 2).

Upon successful authentication of the client device and upon the apparatus receiving a request for a digital certificate or renewal of a digital certificate from the client device, the client application may control the client device for generating a public key and a private key pair; creating a certificate signing request from the generated public key and information of the user inputted to the client device; signing the certificate signing request with the generated private key; and transmitting the certificate signing request signed with the generated private key to the apparatus. (For example, flow diagrams 800 in FIGS. 8 and 900 in FIG. 900)

Upon successful authentication of the client device and upon the apparatus receiving a request for renewal of a digital certificate using an existing public key and an existing private key of the digital certificate from the client device, the client application may control the client device for creating a certificate signing request from the existing public key and information of the user inputted to the client device; signing the certificate signing request with the existing private key; and transmitting the certificate signing request signed with the existing private key to the apparatus. (For example, flow diagram 1000 in FIG. 10)

The client application may further control the client device for sending a request for a digital certificate signed with a Certificate Authority or Registration Authority private key, the digital certificate being created from the certificate signing request transmitted to the apparatus; receiving the digital certificate signed with the Certificate Authority or Registration Authority private key from the apparatus; and linking the digital certificate signed with the Certificate Authority or Registration Authority private key with the generated or existing private key. (For example, steps 830 to 838 in FIG. 8, steps 936 to 944 in FIG. 9, steps 1034 to 1042 in FIG. 10 and steps 1134 to 1142 in FIG. 11)

The apparatus may be controllable for receiving a certificate signing request signed with a private key from the client device; and saving the certificate signing request in a list of certificate signing requests for further processing. (For example, steps 810 to 814 in FIG. 8, steps 910 to 914 in FIG. 9, steps 1014 to 1018 in FIG. 10 and steps 1114 to 1118 in FIG. 11)

The apparatus may be controllable for retrieving the list of certificate signing requests; and carrying out digital certificate approval on the list of certificate signing requests based on a pre-determined digital certificate authentication procedure. (For example, steps 816 to 828 in FIG. 8)

The apparatus may be controllable for retrieving the list of certificate signing requests periodically for carrying out the digital certificate approval on the list of certificate signing requests. (For example, steps 816 to 828 in FIG. 8)

The list of certificate signing requests may be sent to a server, the server being configured for executing a program for creating a digital certificate for each certificate signing request in the list of certificate signing requests; signing each created digital certificate with a Certificate Authority or Registration Authority private key; and saving each created digital certificate with the Certificate Authority or Registration Authority private key in a list of digital certificates stored in the database. (For example, steps 824 to 828 in FIG. 8 and steps 930 to 934 in FIG. 9)

The server may be configured for executing a program for creating a digital certificate for each certificate signing request in the list of certificate signing requests only after an administrator logins to the program and submits through the program an approval for the certificate signing request in the list of certificate signing requests. (For example, steps 916 to 934 in FIG. 9)

Upon successful authentication of the client device, the apparatus may be controllable for revoking the digital certificate of the client device upon request by the client device. (For example, flow diagram 1200 in FIG. 12)

Upon successful authentication of the client device, the apparatus may be controllable for saving a PKCS#12 package received from the client device, the PKCS#12 package being created by the client device from key material of a digital certificate of the client device and from a pass phrase inputted to the client device. (For example, flow diagram 1300 in FIG. 13)

Upon successful authentication of the client device, wherein the client application may control the client device for receiving user input to restore a key material of a digital certificate of the client device; transmitting to the apparatus a request to retrieve a PKCS#12 package created from the key material of the digital certificate of the client device and from a pass phrase inputted to the client device; receiving the PKCS#12 package from the apparatus; and restoring the key material of the digital certificate upon successfully verifying that a pass phrase inputted to the client device is the same as the pass phrase used to create the received PKCS#12 package. (For example, flow diagram 1400 in FIG. 14)

Upon successful authentication of the client device, the apparatus may be controllable for transmitting data associated with validity status of a digital certificate of the client device or of another client device to the client device upon request by the client device. (For example, flow diagram 1500 of FIG. 15)

Upon successful authentication of the client device and upon the apparatus receiving a request for renewal of a digital certificate with replacement of an existing public key and an existing private key of the digital certificate from the client device, the client application may control the client device for creating a replacement public key and a replacement private key; creating a certificate signing request from the replacement public key and information of the user inputted to the client device; signing the certificate signing request with the replacement private key; and transmitting the certificate signing request signed with the replacement private key to the apparatus. (For example, flow diagram 1100 in FIG. 11)

The apparatus may be controllable for periodically updating revocation statuses of one or more digital certificates stored in the database in a certificate revocation list containing information on revocation of the one or more digital certificates.

The apparatus (For example, IRP server 1505 of FIG. 15) may be controllable for determining a domain in which a digital certificate resides upon receiving a request for certificate validity status or revocation status of the digital certificate from the client device; forwarding the request for certificate validity status or revocation status of the digital certificate to a first apparatus (For example, IRP server 1507 of FIG. 15) the same as the apparatus, the first apparatus residing in the determined domain; and forwarding one or more response from the first apparatus to the client device. (For example, flow diagram 1500 of FIG. 15)

The apparatus (For example, IRP server 1605 of FIG. 16) may be controllable for determining a domain in which the client device resides upon receiving a request for user information from the client device; forwarding the request pertaining to user information to a second apparatus (For example, IRP server 1607 of FIG. 16) the same as the apparatus, the second apparatus residing in the determined domain; and forwarding one or more response from the second apparatus to the client device. (For example, flow diagram 1600 of FIG. 16)

Authentication of the client devices may include verifying identification information of the client device, the identification information includes a username and a password, wherein the apparatus is controllable for using Password-Based Key Derivation Function 2 (PBKDF2) for encrypting the password.

A digital certificate of the client device stored in the database may be a server certificate that binds a public key to a Fully Qualified Domain Name (FQDN).

A digital certificate of the client device stored in the database may be a client certificate that binds a public key to a user name and an email address.

A digital certificate of the client device stored in the database may be an Internet Key Exchange (IKE) based certificate that binds a public key to a name of the client device and an Internet Protocol address of the client device.

A digital certificate of the client device stored in the database may be a Resource Public Key Infrastructure (RPKI) based certificate that binds a public key to a device using SEcure Neighbor Discovery (SEND).

A protocol adopted by the apparatus for digital certificate enrolment may be semantically defined in Extensible Markup Language (XML) format.

The client application may adopt Transport Control Protocol (TCP) and the messages communicated between the apparatus and the client device are exchanged based on TCP through a TCP port.

The secure connection may be established based on Transport Layer Security (TLS) or Secure Sockets Layer (SSL).

The client device may be configured to update a new or current Internet Protocol address of the client device to the apparatus if the client device moves from one network to another.

A method for managing digital certificates, the method comprising: transmitting a response to a client device upon receiving a message to get capabilities of the apparatus from the client device, the client device being configured to communicate with the apparatus via a client application not using Hypertext Transfer Protocol, wherein the response indicates capabilities of the apparatus including whether the apparatus is able to establish a secure connection with the client device and whether the apparatus supports one or more authentication methods for authenticating the client device; authenticating the client device via the authentication method supported by the apparatus and selected based on user input to the client application; transmitting a digital certificate having a public key to the client device after the secure connection is established to enable authentication via verifying a private key corresponding to the public key if the selected authentication method authenticates via verifying the private key corresponding to the public key; and establishing the secure connection to communicate with the client device if the apparatus is able to establish the secure connection, wherein messages communicated via the secure connection between the apparatus and the client device are encrypted.

Many modifications and other examples can be made to the apparatus and method for managing digital certificates by those skilled in the art having the understanding of the above described disclosure together with the drawings. Therefore, it is to be understood that the apparatus and method for managing digital certificates is not to be limited to the above description contained herein only, and that possible modifications are to be included in the claims of the disclosure.

The invention claimed is:

1. A method for managing user identity, the method comprising:
   establishing a connection secured with Transport Layer Security (TLS) from a client device to an Identity Registration Protocol (IRP) server;
   authenticating, at the IRP server, user login via the client device, with Strong Client Authentication (SCA) or Username/Password Authentication (UPA);
   upon request from the client device via the secured connection, registering or retrieving at the IRP server user identity information comprising user information, and an Internet Protocol (IP) address of the client device;
   upon request from the client device via the secure connection, registering or retrieving at the IRP server one or more digital certificate;
   sending as part of a request from the client device to the IRP server a Certificate Signing Request (CSR) via the secured connection;
   upon request from the client device via the secured connection, returning a signed digital certificate from the IRP server to the client device via the secured connection;

sending a PKCS #12 package as part of a request from the client device to the IRP server via the secured connection;

upon request from the client device via the secured connection, returning the PKCS #12 package from the IRP server to the client device via the secured connection;

upon a request for certificate validity status or revocation status of the digital certificate from the client device via the secured connection, determining at the IRP server a user identifier from a user's digital certificate;

determining at the IRP server a domain name of a second IRP server from the user identifier;

performing at the IRP server a Domain Name Server (DNS) SRV look up based on the domain name of the second IRP server;

obtaining from the DNS SRV look up a hostname of the second IRP server at the IRP server;

establishing a connection secured with TLS from the IRP server to the second IRP server;

authenticating at the second IRP server user login via the IRP server;

forwarding from the IRP server the request for certificate validity status or revocation status of the digital certificate to the second IRP server;

sending the certificate validity status or revocation status of the digital certificate from the second IRP server to the IRP server; and sending the certificate validity status or revocation status of the digital certificate from IRP server to the client device.

2. The method as claimed in claim 1, wherein messages exchanged between the IRP server and the client device via the secured connection are semantically defined in Extensible Markup Language (XML) format.

3. The method as claimed in claim 1, wherein the method comprises:
sending as part of a request from the client device to the IRP server a request to revoke a digital certificate.

4. The method as claimed in claim 1, wherein the method comprises:
upon request from the client device via the secured connection, sending validity status or revocation status of a digital certificate from the IRP server to the client device via the secured connection.

5. The method as claimed in claim 1, wherein the method comprises:
if the SCA is unsuccessful, enabling UPA at the IRP server upon request to allow authentication of the user login via UPA.

6. The method as claimed in claim 1, wherein the method comprises:
disabling UPA at the IRP server for user authentication when a digital certificate for SCA is obtained by the client device from the IRP server.

7. The method as claimed in claim 1, wherein the method comprises:
enabling UPA at the IRP server for a predetermined time period; and
disabling the UPA at the IRP server after the predetermined time period.

8. The method as claimed in 6, wherein the method comprises:
encrypting a password used for the UPA when the UPA is disabled; and
decrypting the password used for the UPA when the UPA is enabled.

9. The method as claimed in 7, wherein the method comprises:
encrypting a password used for the UPA when the UPA is disabled; and
decrypting the password used for the UPA when the UPA is enabled.

10. The method as claimed in claim 1, wherein the method comprises:
upon a request for user identity information from the client device via the secured connection, determining at the IRP server a user identifier from the requested user identity information;
determining at the IRP server a domain name of a third IRP server from the user identifier;
performing at the IRP server a Domain Name Server (DNS) SRV look up based on the domain name of the third IRP server;
obtaining from the DNS SRV look up a hostname of the third IRP server at the IRP server;
establishing a connection secured with TLS from the IRP server to the third IRP server;
authenticating at the third IRP server user login via the IRP server;
forwarding from the IRP server the request for user identity information to the third IRP server;
sending the user identity information from the third IRP server to the IRP server; and
sending the user identity information from IRP server to the client device.

11. The method as claimed in claim 1, wherein the method comprises:
upon request from the client device via the secured connection, returning from the IRP server to the client device a list of Certificate hierarchies on a Certification Authority via the secured connection; and
upon request from the client device via the secured connection, returning from the IRP server to the client device Certification Authority certificates via the secured connection.

12. An apparatus for managing user identity, the apparatus comprising:
one or more hardware processors configured to execute program codes to control the apparatus to:
establish a connection secured with Transport Layer Security (TLS) from a client device to the apparatus;
authenticate user login via the client device, with Strong Client Authentication (SCA) or Username/Password Authentication (UPA);
upon request from the client device via the secured connection, register or retrieve user identity information comprising user information, and an Internet Protocol (IP) address of the client device;
upon request from the client device via the secure connection, register or retrieve one or more digital certificate;
receive as part of a request from the client device a Certificate Signing Request (CSR) via the secured connection;
upon request from the client device via the secured connection, return a signed digital certificate to the client device via the secured connection;
receive a PKCS #12 package as part of a request from the client device via the secured connection; and
upon request from the client device via the secured connection, return the PKCS #12 package to the client device via the secured connections;

upon a request for certificate validity status or revocation status of the digital certificate from the client device via the secured connection, determining at the IRP server a user identifier from a user's digital certificate;

determining at the IRP server a domain name of a second IRP server from the user identifier;

performing at the IRP server a Domain Name Server (DNS) SRV look up based on the domain name of the second IRP server;

obtaining from the DNS SRV look up a hostname of the second IRP server at the IRP server;

establishing a connection secured with TLS from the IRP server to the second IRP server;

authenticating at the second IRP server user login via the IRP server;

forwarding from the IRP server the request for certificate validity status or revocation status of the digital certificate to the second IRP server;

sending the certificate validity status or revocation status of the digital certificate from the second IRP server to the IRP server; and sending the certificate validity status or revocation status of the digital certificate from IRP server to the client device.

13. A non-transitory computer-readable medium storing a program causing a computer to execute a method for managing user identity, the method comprising:

establishing a connection secured with Transport Layer Security (TLS) from a client device to an Identity Registration Protocol (IRP) server;

authenticating, at the IRP server, user login via the client device, with Strong Client Authentication (SCA) or Username/Password Authentication (UPA);

upon request from the client device via the secured connection, registering or retrieving at the IRP server user identity information comprising user information, and an Internet Protocol (IP) address of the client device;

upon request from the client device via the secure connection, registering or retrieving at the IRP server one or more digital certificate;

sending as part of a request from the client device to the IRP server a Certificate Signing Request (CSR) via the secured connection;

upon request from the client device via the secured connection, returning a signed digital certificate from the IRP server to the client device via the secured connection;

sending a PKCS #12 package as part of a request from the client device to the IRP server via the secured connection; and upon request from the client device via the secured connection, returning the PKCS #12 package from the IRP server to the client device via the secured connection;

upon a request for certificate validity status or revocation status of the digital certificate from the client device via the secured connection, determining at the IRP server a user identifier from a user's digital certificate;

determining at the IRP server a domain name of a second IRP server from the user identifier;

performing at the IRP server a Domain Name Server (DNS) SRV look up based on the domain name of the second IRP server;

obtaining from the DNS SRV look up a hostname of the second IRP server at the IRP server;

establishing a connection secured with TLS from the IRP server to the second IRP server;

authenticating at the second IRP server user login via the IRP server;

forwarding from the IRP server the request for certificate validity status or revocation status of the digital certificate to the second IRP server;

sending the certificate validity status or revocation status of the digital certificate from the second IRP server to the IRP server; and sending the certificate validity status or revocation status of the digital certificate from IRP server to the client device.

* * * * *